(12) United States Patent
Gouko et al.

(10) Patent No.: US 10,724,914 B2
(45) Date of Patent: Jul. 28, 2020

(54) MONITORING APPARATUS AND ABNORMALITY DIAGNOSIS APPARATUS

(71) Applicant: DENSO CORPORATION, Kariya, Aichi-pref. (JP)

(72) Inventors: Norio Gouko, Kariya (JP); Toshihisa Taniguchi, Kariya (JP); Atusi Sakaida, Kariya (JP); Keiji Okamoto, Kariya (JP); Yoshihiko Shiraishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 231 days.

(21) Appl. No.: 15/765,781

(22) PCT Filed: Oct. 4, 2016

(86) PCT No.: PCT/JP2016/079432
§ 371 (c)(1),
(2) Date: Apr. 4, 2018

(87) PCT Pub. No.: WO2017/061411
PCT Pub. Date: Apr. 13, 2017

(65) Prior Publication Data
US 2018/0299339 A1    Oct. 18, 2018

(30) Foreign Application Priority Data

Oct. 5, 2015 (JP) ................................. 2015-197894
Mar. 28, 2016 (JP) ................................. 2016-064556

(51) Int. Cl.
*G01L 11/00* (2006.01)
*G01M 3/26* (2006.01)
(Continued)

(52) U.S. Cl.
CPC ........ *G01L 11/002* (2013.01); *F15B 15/2807* (2013.01); *F15B 15/2815* (2013.01);
(Continued)

(58) Field of Classification Search
CPC .............. F15B 15/2807; F15B 15/2815; F15B 19/005; F15B 2211/864; F15B 2211/87; G01L 11/00; G01L 11/002
See application file for complete search history.

(56) References Cited

U.S. PATENT DOCUMENTS

| 4,874,032 A | 10/1989 | Hatamura |
|---|---|---|
| 7,249,885 B2 | 7/2007 | Van Den Ende et al. |

(Continued)

FOREIGN PATENT DOCUMENTS

| EP | 1772717 A1 * | 4/2007 | ............ G01L 11/002 |
|---|---|---|---|
| JP | S63072467 A | 4/1988 | |

(Continued)

OTHER PUBLICATIONS mekanizmalar.com , "Large Pneumatic Cylinder with two input pressure", Apr. 14, 2011, https://m.youtube.com/watch?reload=9 &v=kNvDAM2fovA <https://protect-us.mimecast.com/s/5NwwCn5Yx7hLGqxF9u_oU>.

*Primary Examiner* — Nguyen Q. Ha
(74) *Attorney, Agent, or Firm* — Harness, Dickey & Pierce, P.L.C.

(57) ABSTRACT

Provided is a monitoring apparatus configured to monitor the pressure state of a fluid in a target apparatus having a chamber in which at least one of compression and expansion of the fluid is performed. The monitoring apparatus includes a heat flux sensor provided for the target apparatus and configured to measure a heat flux between inside and outside of the chamber. The monitoring apparatus includes a determining unit configured to determine the pressure state of the fluid based on a measurement result of the heat flux sensor.

10 Claims, 30 Drawing Sheets

(51) Int. Cl.
*F15B 15/28* (2006.01)
*F15B 19/00* (2006.01)

(52) U.S. Cl.
CPC ............. *F15B 19/005* (2013.01); *G01M 3/26* (2013.01); *F15B 2211/864* (2013.01); *F15B 2211/87* (2013.01)

(56) References Cited

U.S. PATENT DOCUMENTS

| | | |
|---|---|---|
| 2012/0048396 A1 | 3/2012 | Takemoto |
| 2015/0144171 A1 | 5/2015 | Taniguchi et al. |
| 2016/0125671 A1 | 5/2016 | Tanaka et al. |
| 2017/0213953 A1 | 7/2017 | Taniguchi et al. |

FOREIGN PATENT DOCUMENTS

| | | | | |
|---|---|---|---|---|
| JP | 2005330837 A | | 12/2005 | |
| JP | 2010241034 A | | 10/2010 | |
| JP | 2012052652 A | | 3/2012 | |
| JP | 2013032726 A | * | 2/2013 | ............. F02D 45/00 |
| JP | 5376086 B1 | | 12/2013 | |
| JP | 2014046488 A | | 3/2014 | |
| JP | 2015014586 A | | 1/2015 | |
| TW | 200530492 A | | 9/2005 | |

* cited by examiner

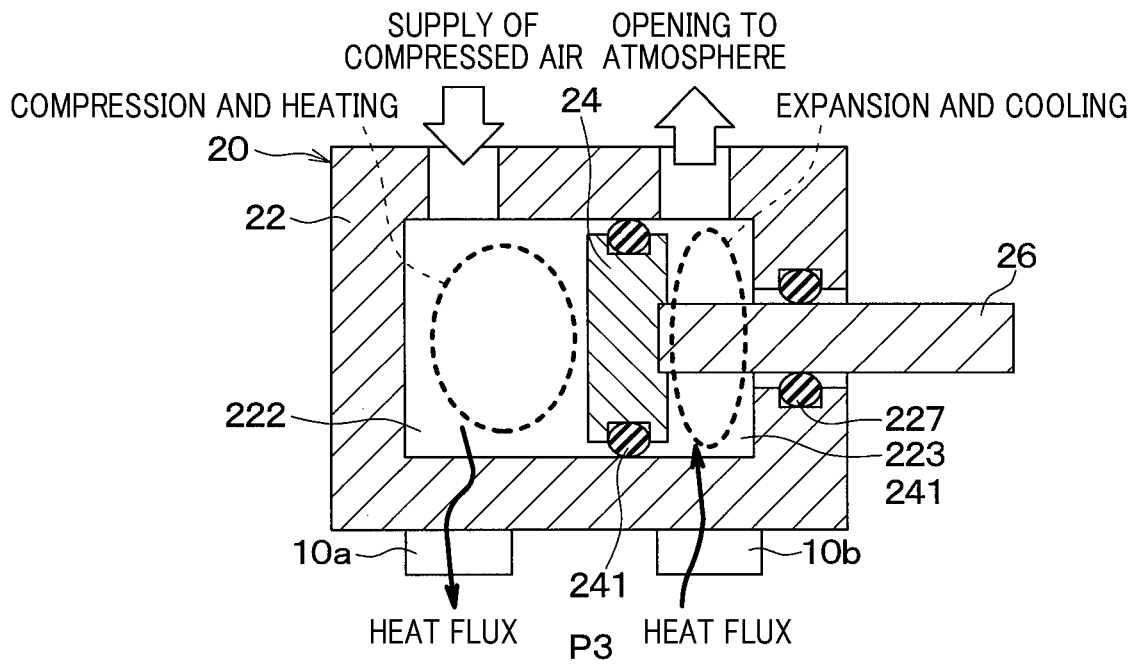
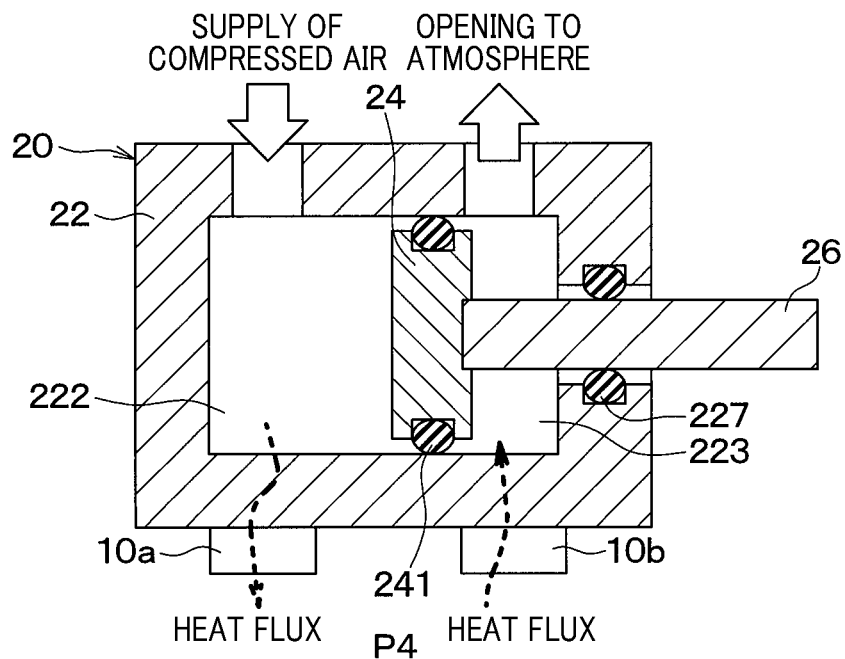

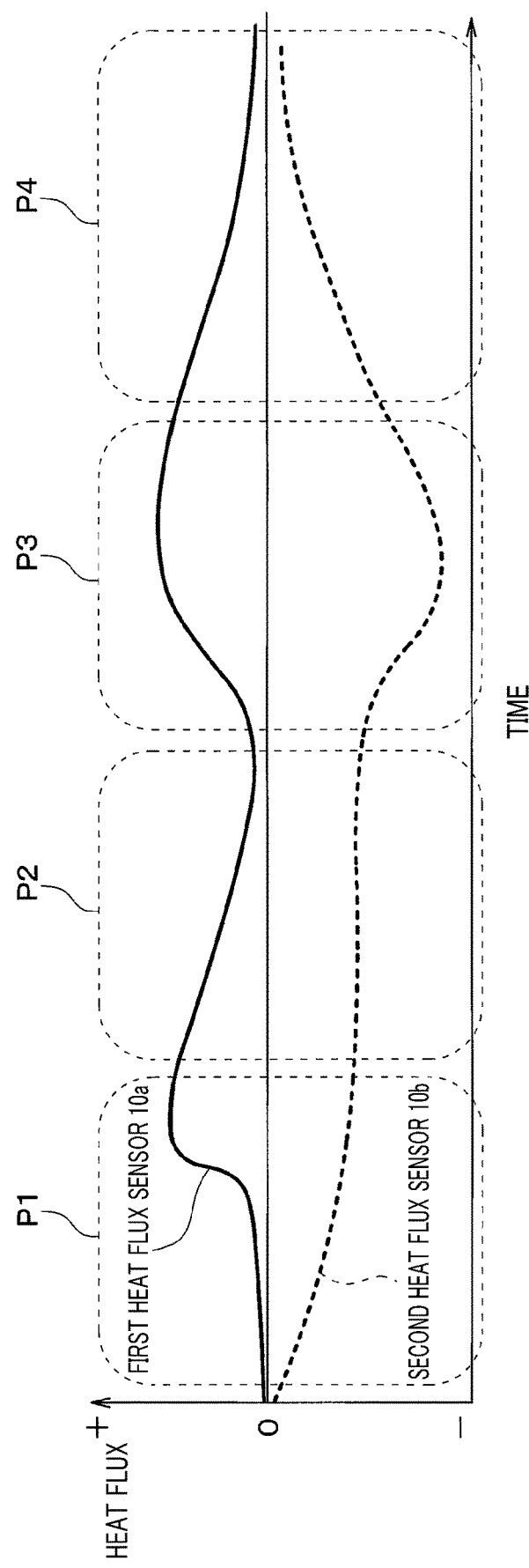

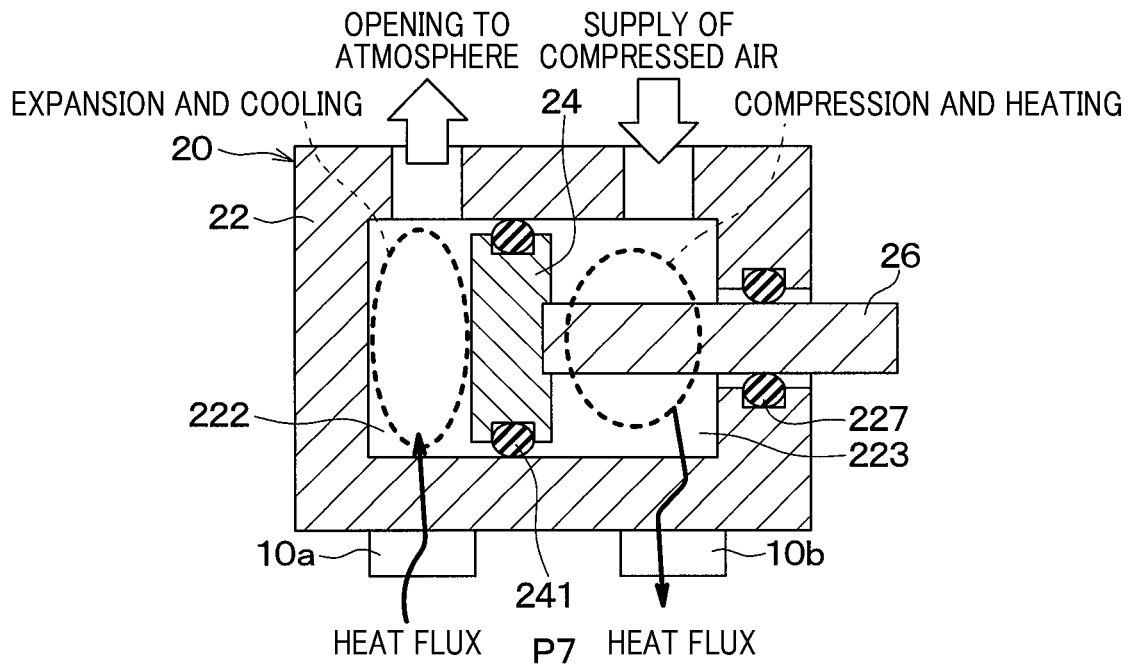
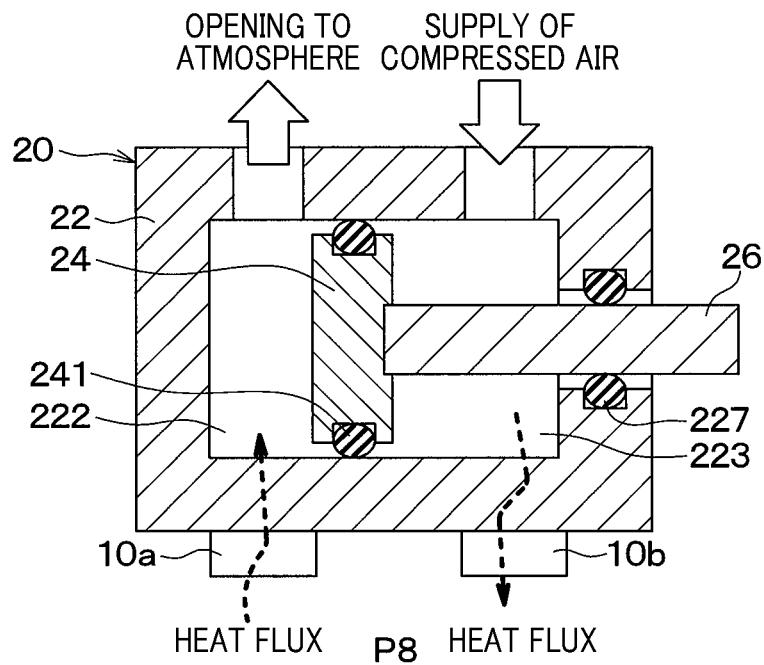

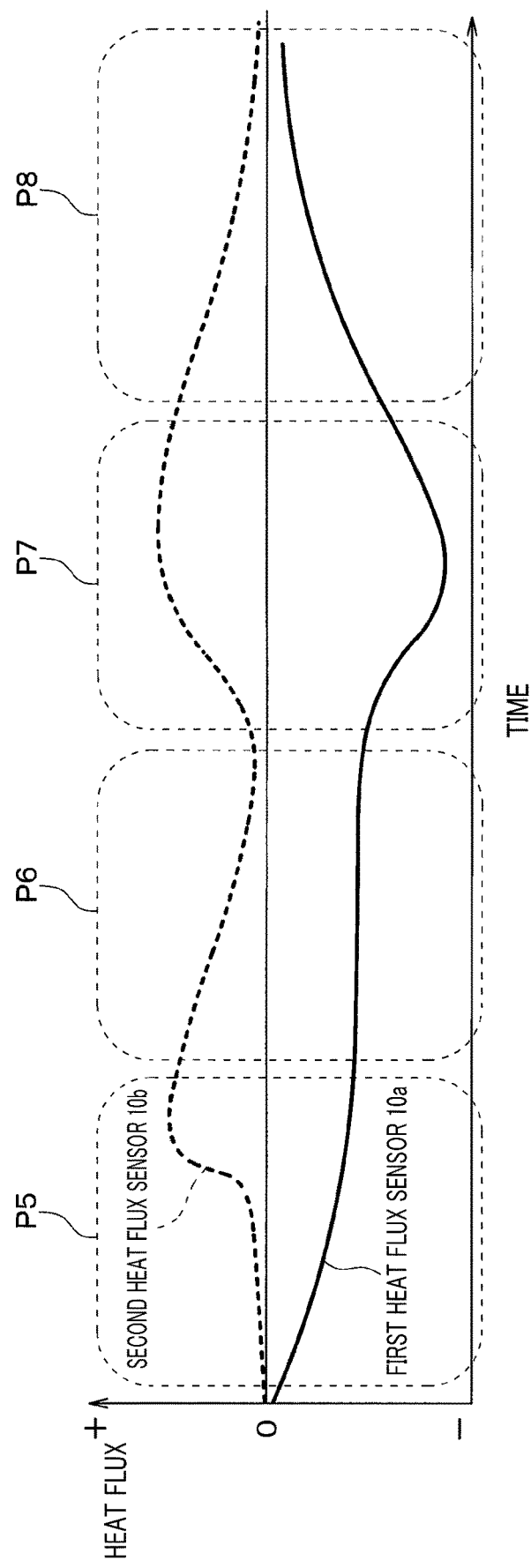

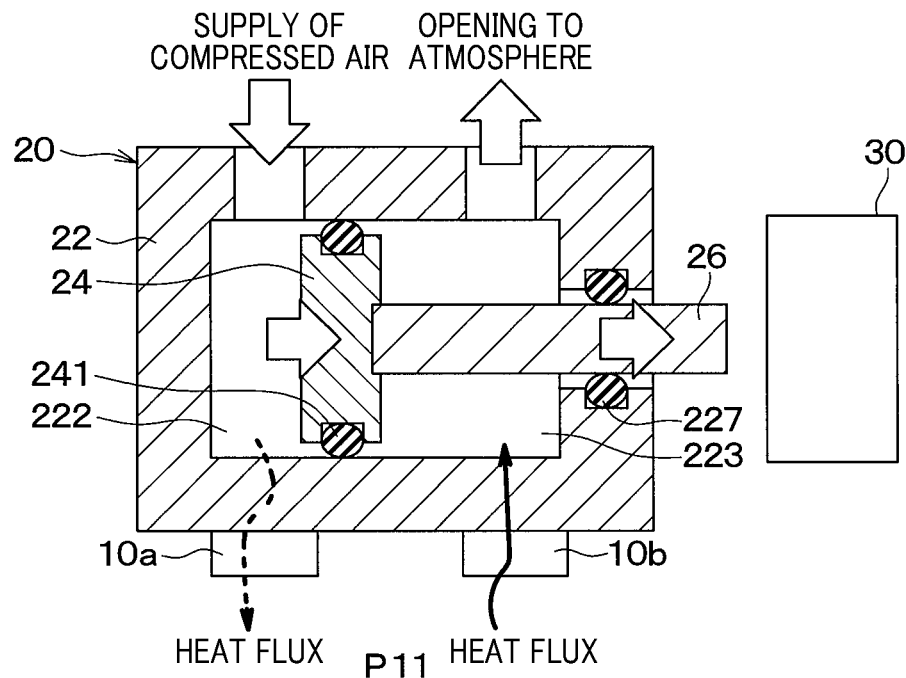
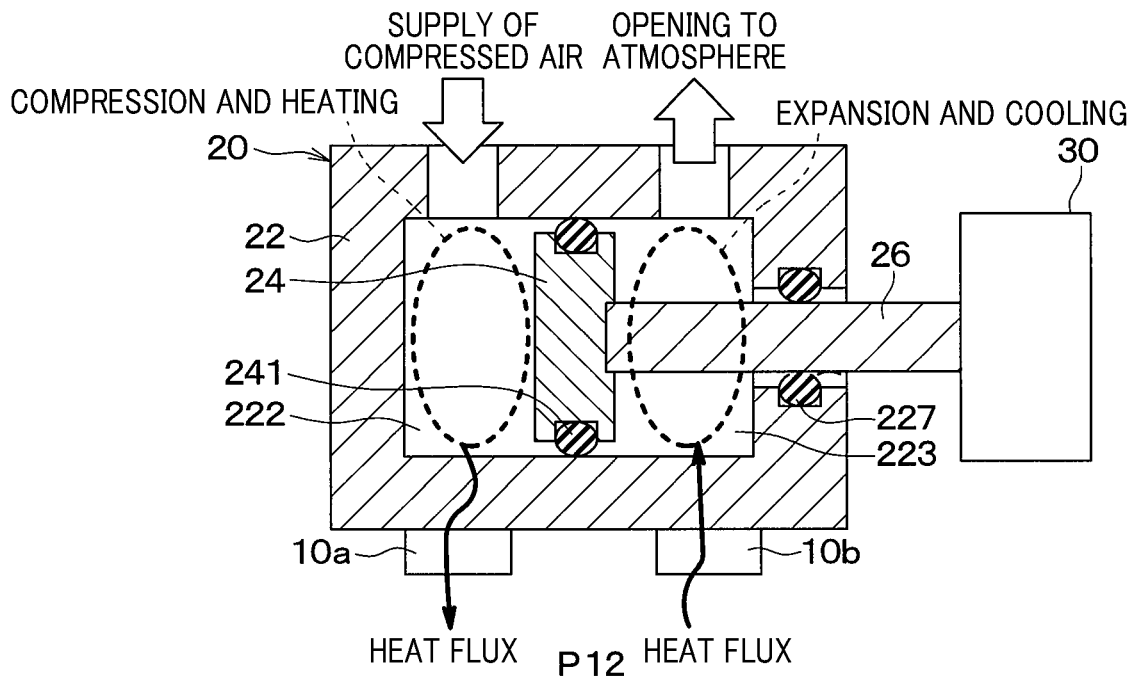

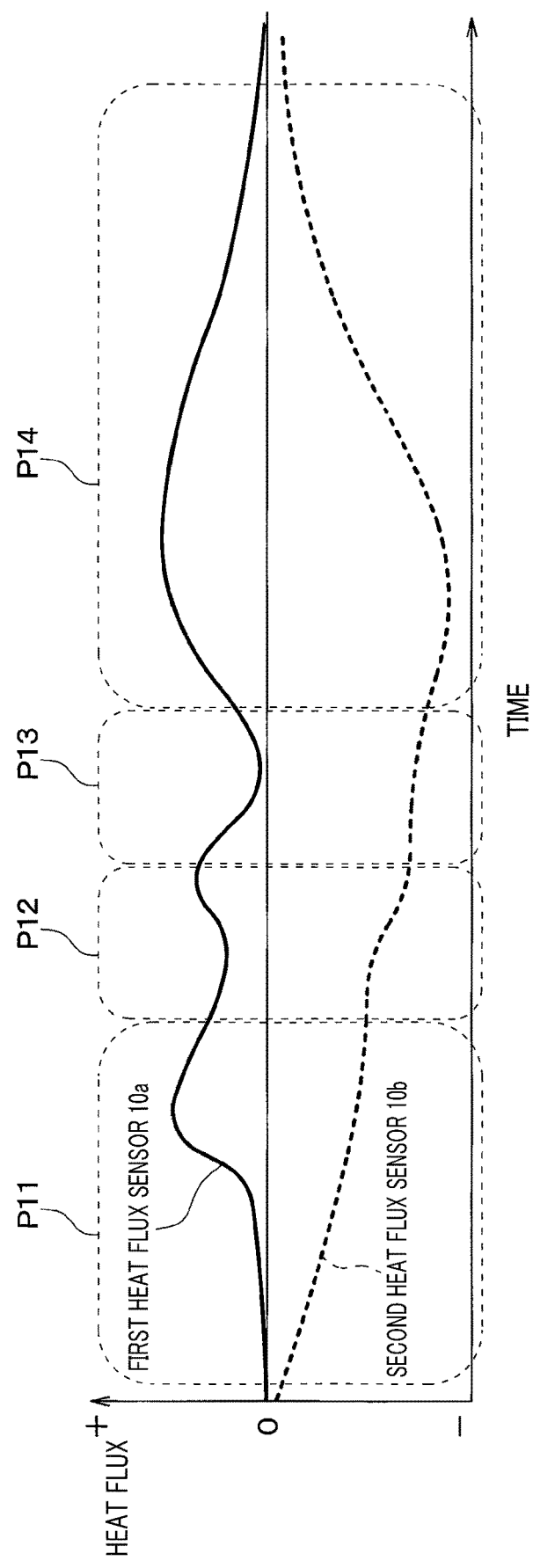

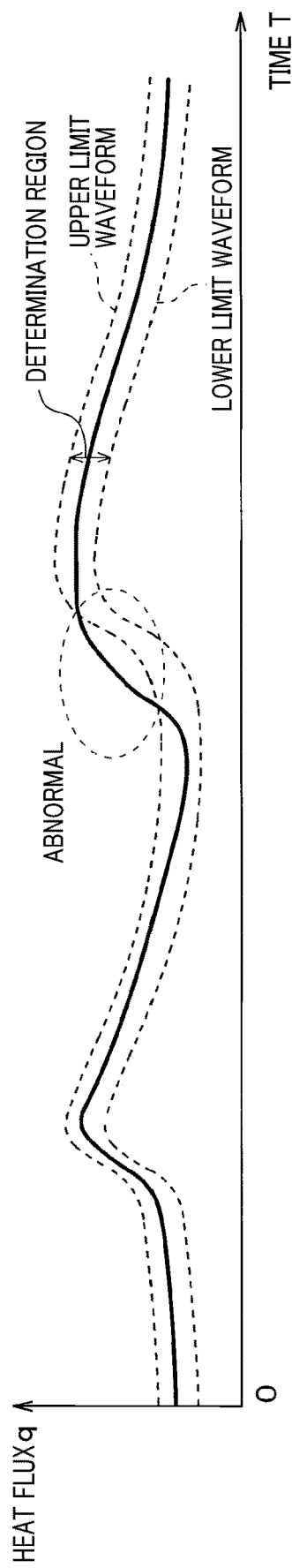

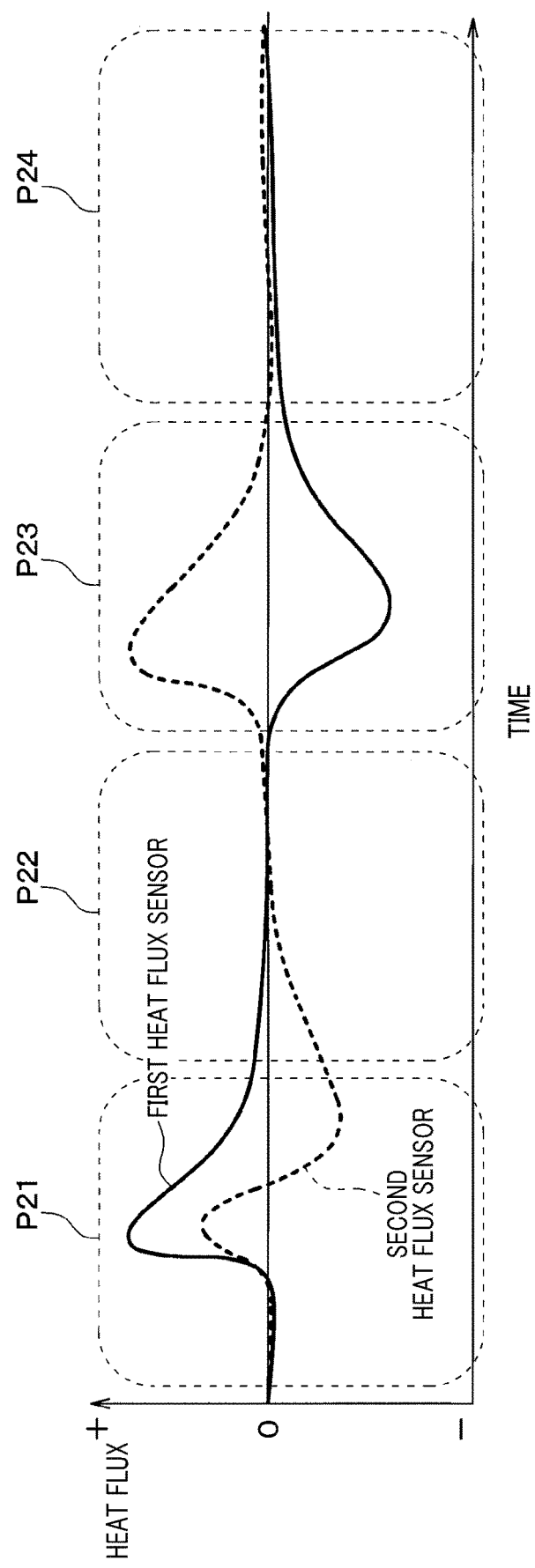

MONITORING APPARATUS AND ABNORMALITY DIAGNOSIS APPARATUS

CROSS REFERENCE TO RELATED APPLICATIONS

This application is a U.S. National Phase Application under 35 U.S.C. 371 of International Application No. PCT/JP2016/079432 filed on Oct. 4, 2016 and published in Japanese as WO 2017/061411 A1 on Apr. 13, 2017. This application is based on and claims the benefit of priority from Japanese Patent Application No. 2015-197894 filed on Oct. 5, 2015 and Japanese Patent Application No. 2016-064556 filed on Mar. 28, 2016. The entire disclosures of all of the above applications are incorporated herein by reference.

TECHNICAL FIELD

The present disclosure relates to a monitoring apparatus for monitoring a pressure state of a fluid and an abnormality diagnosis apparatus for diagnosing whether there is an abnormality in a target apparatus.

BACKGROUND ART

As a heat flux sensor which detects a heat flux, there is, for example, a heat flux sensor disclosed in patent literature (PTL) 1.

CITATION LIST

Patent Literature

[PTL 1] Japanese Patent Publication No. 5376086 B

SUMMARY OF THE INVENTION

Technical Problem

There is a power cylinder which reciprocates a piston based on a fluid pressure, such as an air pressure, an oil hydraulic pressure, and a water hydraulic pressure as motive power. The power cylinder is also referred to as a fluid pressure-driven device. An air cylinder, which is powered by an air pressure among such power cylinders, is used as an actuator in production facilities.

The power cylinder has internal space, and the inner space is comprised of first and second chambers partitioned with a piston. A compressed fluid is supplied to the first chamber, and a compressed fluid is discharged from the second chamber. Switching between a task of supplying fluid to the first chamber while discharging fluid from the second chamber and a task of supplying fluid to the second chamber while discharging fluid from the first chamber cause the piston to reciprocate. In each of the first and second chambers, fluid is compressed or expanded, resulting in change of the pressure state of the fluid.

As an abnormality diagnosis apparatus which diagnoses whether there is an abnormality in such a power cylinder, it is desired to develop an abnormality diagnosis apparatus, which is capable of diagnosing whether there is an abnormality based on the pressure state of a fluid inside a chamber.

To embody such an abnormality diagnosis apparatus, there is a possible approach, which forms a hole through a wall of a chamber, and attaches a manometer to the hole.

However, as a result of detailed study by inventors, the following problem has been found. That is, it is not preferable to form a hole through a wall of a chamber in which the inside pressure is changeable, because the hole may have an impact on the internal state of the chamber. It is therefore desired to develop an abnormality diagnosis apparatus, which is capable of diagnosing whether there is an abnormality in the power cylinder based on the pressure state of a fluid inside a chamber while there are no holes formed through a wall of the chamber and no measuring devices attached to such a hole.

Note that this problem not only arises in abnormality diagnosis apparatuses for power cylinders as their targets, but also similarly occurs in abnormality diagnosis apparatuses for target apparatuses other than power cylinders; each of the target apparatuses has a chamber in which a fluid is compressed or expanded.

As with the above-described abnormality diagnosis apparatuses, it is desired to develop monitoring apparatuses for a target apparatus in which the fluid is compressed or expanded; each of the monitoring apparatuses is capable of monitoring the pressure state of a fluid inside the chamber while there are no holes formed through a wall of the chamber and no measuring devices attached to the hole.

From these viewpoints, the present disclosure aims to provide monitoring apparatuses, each of which is capable of monitoring the pressure state of a fluid inside a chamber without a hole being formed on a wall of the chamber and without a measurement device being attached to the hole. Additionally, the present disclosure also aims to provide abnormality diagnosis apparatuses, each of which is capable of performing abnormality diagnosis based on the state of a fluid inside a chamber.

Solution to Problem

A monitoring apparatus according to a first aspect of the present disclosure is a monitoring apparatus for monitoring the pressure state of a fluid in a target apparatus having a chamber in which at least one of compression and expansion of the fluid is performed. The monitoring apparatus includes a heat flux sensor provided for the target apparatus and configured to measure a heat flux between inside and outside of the chamber. The monitoring apparatus includes a determining unit configured to determine the pressure state of the fluid based on a measurement result of the heat flux sensor.

The compression of the fluid described above represents a situation that the pressure of the fluid increases and a temperature of the fluid rises as compared to the pressure and temperature of the fluid before the fluid was compressed. The expansion of the fluid described above represents a situation that the pressure of the fluid decreases and the temperature of the fluid decreases as compared to pressure and temperature of the fluid before the fluid was expanded.

At least one of the compression and expansion of the fluid inside the chamber causes the pressure state of the fluid inside the chamber to be changed, resulting in change of the heat flux between inside and outside of the chamber. Measuring the heat flux between inside and outside of the chamber therefore enables the pressure state of the fluid to be determined.

It is possible to measure the heat flux between inside and outside of the chamber without a hole being formed through a wall of the chamber. The monitoring apparatus therefore makes it possible to monitor the pressure state of the fluid inside the chamber without a hole being formed through the wall of the chamber for attaching a measurement device to the hole.

An abnormality diagnosis apparatus according to a second aspect of the present disclosure is an abnormality diagnosis apparatus for diagnosing whether there is an abnormality in a target apparatus having a chamber in which at least one of compression and expansion of a fluid is performed. The abnormality diagnosis apparatus includes a heat flux sensor provided for the target apparatus and configured to measure a heat flux between inside and outside of the chamber. The abnormality diagnosis apparatus includes a determining unit configured to determine whether there is an abnormality in the target apparatus based on a measurement result of the heat flux sensor.

The compression of the fluid described above represents a phenomenon that the pressure of the fluid increases and a temperature of the fluid rises as compared to the pressure and temperature of the fluid before the fluid being compressed. The expansion of the fluid described above represents a phenomenon that the pressure of the fluid decreases and the temperature of the fluid decreases as compared to the pressure and temperature of the fluid before the fluid being expanded.

At least one of compression and expansion of the fluid inside the chamber causes the pressure state of the fluid inside the chamber to be changed, resulting in change of the heat flux between inside and outside of the chamber. How the heat flux is changed in the target apparatus operating normally is different from how the heat flux is changed in the target apparatus operating abnormally. Measuring the heat flux between inside and outside of the chamber therefore enables whether there is an abnormality in the target apparatus to be determined.

It is possible to measure the heat flux between inside and outside of the chamber without a hole being formed through a wall of the chamber. The abnormality diagnosis apparatus therefore makes it possible to determine whether there is an abnormality in the target apparatus in accordance with the state of the fluid inside the chamber without a hole being formed through the wall of the chamber for attaching a measurement device to the hole.

BRIEF DESCRIPTION OF DRAWINGS

FIG. 4C is a cross-sectional view of the air cylinder in a period P3 according to the normal example 1 of the first embodiment.

FIG. 4D is a cross-sectional view of the air cylinder in a period P4 according to the normal example 1 of the first embodiment.

FIG. 5 is a graph illustrating change of a heat flux over time according to the normal example 1 of the first embodiment.

FIG. 6C is a cross-sectional view of the air cylinder in a period P7 according to the normal example 2 of the first embodiment.

FIG. 6D is a cross-sectional view of the air cylinder in a period P8 according to the normal example 2 of the first embodiment.

FIG. 7 is a graph illustrating change of a heat flux over time according to the normal example 2 of the first embodiment.

FIG. 8A is a cross-sectional view of the air cylinder in a period P11 according to a normal example 3 of the first embodiment.

FIG. 8B is a cross-sectional view of the air cylinder in a period P12 according to the normal example 3 of the first embodiment.

FIG. 9 is a graph illustrating change of a heat flux over time according to the normal example 3 of the first embodiment.

FIG. 23 is a graph for explaining an abnormality determining method according to the fourth embodiment.

FIG. 25 is a graph illustrating change of a heat flux over time according to a normal operation of the fifth embodiment.

DESCRIPTION OF EMBODIMENTS

Figure 1:
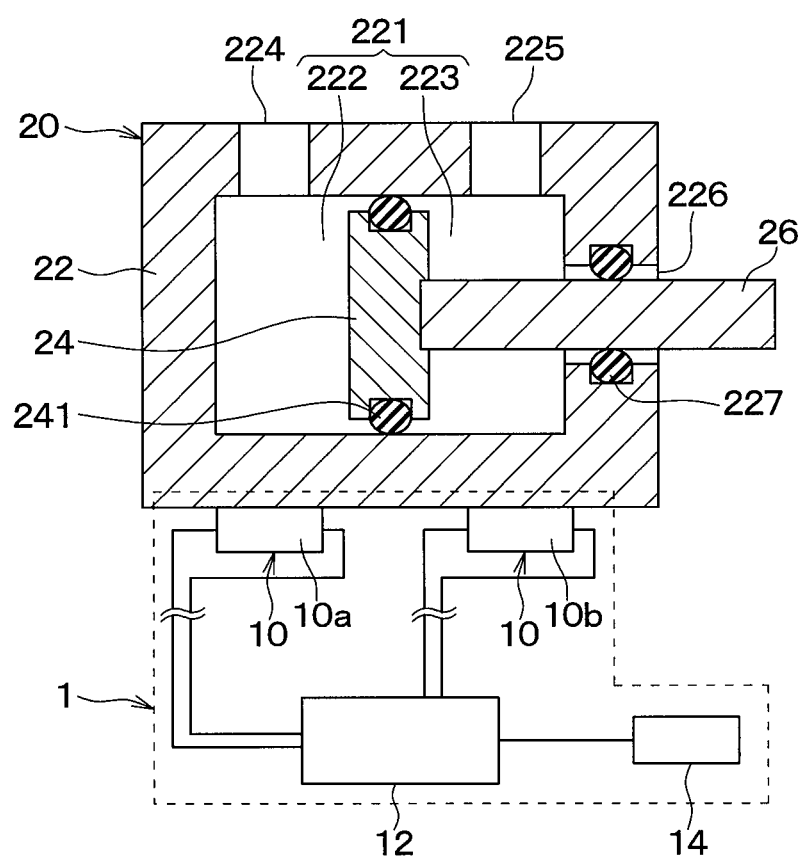
FIG. 1 is a diagram illustrating an abnormality diagnosis apparatus and an air cylinder according to the first embodiment.

The following describes embodiments of the present disclosure with reference to the drawings. Note that, in the following embodiments, description will be provided with the same reference numerals assigned to the same or equivalent elements.

First Embodiment

In the present embodiment, an abnormality diagnosis apparatus as a monitoring apparatus will be described. As illustrated in FIG. 1, an abnormality diagnosis apparatus 1 of the present embodiment diagnoses whether there is an abnormality in an air cylinder 20 as a target apparatus.

The air cylinder 20 is a power cylinder which reciprocates a piston 24 by being powered by an air pressure. The air cylinder 20 includes a cylinder 22, the piston 24 and a piston rod 26. The cylinder 22, the piston 24 and the piston rod 26 are made of metal.

The cylinder 22 is a housing having a cylindrical internal space (that is, a chamber) 221. The cylinder 22 is therefore also referred to as a cylinder housing. The chamber 221 is separated into two chambers of a first chamber 222 and a second chamber 223 by the piston 24. The first chamber 222 is disposed at the opposite side of the piston rod 26 across the piston 24. The second chamber 223 is disposed to be closer to the piston rod 26 then the first chamber 222 is. A first opening 224, which communicates with the first chamber 222, is formed through the cylinder 22. A second opening 225, which communicates with the second chamber 223, is formed through the cylinder 22.

The piston 24 is disposed inside the chamber 221. Rubber seal members 241 are respectively attached to both sides of the piston 24. Each of the seal members 241 seals a corresponding space between the piston 24 and the cylinder 22. The piston 24 is configured to slide with respect to inner surfaces of the cylinder 22 via the seal members 241.

The piston rod 26 is an axial member moving in conjunction with the piston 24. A third opening 226 is formed through the cylinder 22. The piston rod 26 passes through the third opening 226. Rubber seal members 227 are respectively attached to inner wall surfaces; the inner wall surfaces define the third opening 226. Each of the seal members 227 seals a corresponding space between the piston rod 26 and the cylinder 22. The piston rod 26 is configured to slide with respect to inner surfaces of the cylinder 22 via the seal members 227.

An unillustrated flow channel changeover valve is connected to the first opening 224 and the second opening 225 of the cylinder 22. The flow channel changeover valve switches connection of each of the first opening 224 and the second opening 225 between an unillustrated air supply flow channel and an unillustrated air discharge flow channel. The air supply flow channel is connected to an unillustrated air compressor, which serves as a supply source of compressed air. The air discharge flow channel is configured to be open to the atmosphere.

The flow channel changeover valve switches between a first state and a second state. The first state represents a state in which compressed air is supplied into the first chamber 22, and the second chamber 223 is open to the atmosphere, and the second state represents a state in which the first chamber 222 is open to the atmosphere, and compressed air is supplied into the second chamber 223.

A flow regulating valve, which is not illustrated, is provided at each of a flow channel continuing into the first opening 224 and a flow channel continuing into the second opening 225. The flow regulating valve serves as a speed controller, which adjusts the flow rate of supplied compressed air to thereby change the operation speed of the piston 24.

As illustrated in FIG. 1, the abnormality diagnosis apparatus 1 includes a plurality of heat flux sensors 10, a control apparatus 12 and a display apparatus 14.

The heat flux sensor 10 detects a heat flux between the inside and outside of the cylinder 22. The plurality of heat flux sensors 10 are attached to the outer surface of the cylinder 22. In the present embodiment, the heat flux sensors 10 include a first heat flux sensor 10a and a second heat flux sensor 10b.

The first heat flux sensor 10a is disposed at a portion of the outer surface of the cylinder 22; the portion is closest to the first chamber 222. The first heat flux sensor 10a measures a heat flux between the inside and outside of the first chamber 222. The second heat flux sensor 10b is disposed at a portion of the outer surface of the cylinder 22; the portion is closest to the second chamber 223. The second heat flux sensor 10b measures a heat flux between the inside and outside of the second chamber 223. Each heat flux sensor 10 has a planar shape. The internal structure of each heat flux sensor 10 will be described later. Each heat flux sensor 10 is connected to an input unit of the control apparatus 12.

The control apparatus 12 performs abnormality diagnosis control of the air cylinder 20. This abnormality diagnosis control is configured to determine whether there is an abnormality in the air cylinder 20 based on the measurement results of the heat flux sensors 10. The control apparatus 12 therefore serves as a determining unit configured to determine whether there is an abnormality in a target apparatus based on the measurement result of each heat flux sensor 10.

The display apparatus 14 is connected to an output unit of the control apparatus 12. If there is an abnormality in the air cylinder 20, the control apparatus 12 causes the display apparatus 14 to display information indicative of the occurrence of an abnormality. The control apparatus 12 includes, for example, a microcomputer and a storage apparatus.

The display apparatus 14 is an alarm apparatus for generating, to a user, an alarm representing that there is an abnormality in the air cylinder 20. For example, a liquid crystal display is used as the display apparatus 14.

Figure 2:
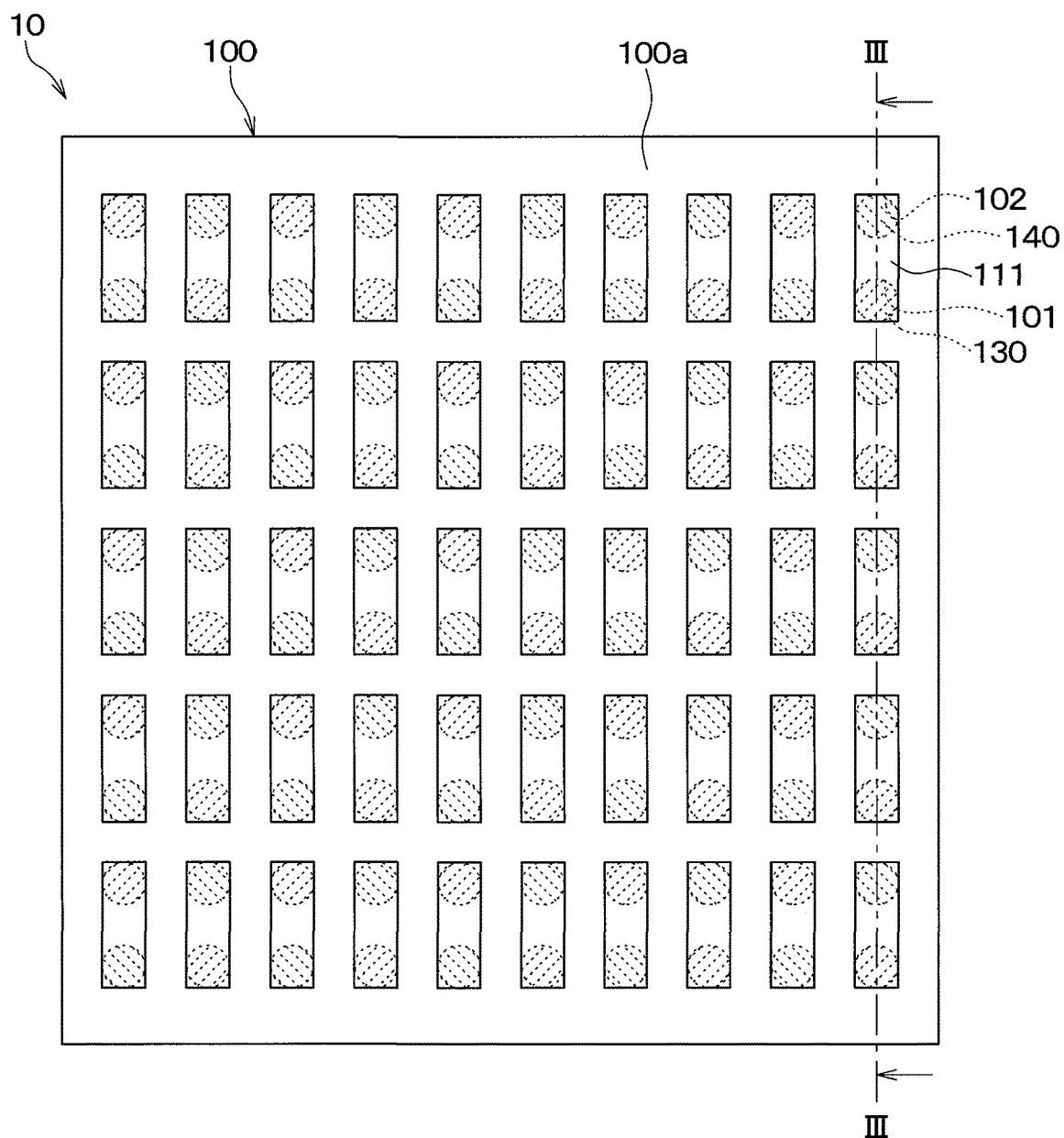
FIG. 2 is a plan view of a heat flux sensor in FIG. 1.
Figure 3:
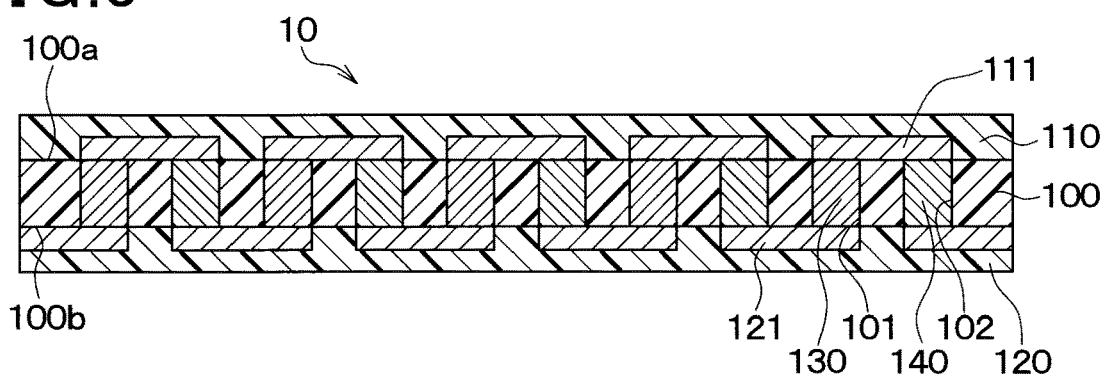
FIG. 3 is a cross-sectional view taken along line III-III in FIG. 2.

As illustrated in FIGS. 2 and 3, each of the heat flux sensors 10 is configured such that an insulating substrate 100, a surface protecting member 110 and a rear surface protecting member 120 are integrated to each other. Each of the heat flux sensors 10 includes, inside the corresponding integrated structure, first and second interlayer connection members 130 and 140 are alternately connected in series. Note that illustration of the surface protecting member 110 is omitted in FIG. 2. The insulating substrate 100, the surface protecting member 110 and the rear surface protecting member 120 are film members and are each composed of a resin material having flexibility, such as a thermoplastic resin.

The insulating substrate 100 has first and second via holes 101 and 102 penetrated therethrough in the thickness direction of the insulating substrate 100. The first and the second interlayer connection members 130 and 140 are embedded into the respective first and the second via holes 101 and 102. The first and the second interlayer connection members 130 and 140 are respectively composed of thermoelectric materials, such as metals or semiconductors, which are different from each other. A front conductor pattern 111 arranged on a front surface 100a of the insulating substrate 100 constitutes a first connection member of one of the first and the second interlayer connection members 130 and 140. A rear conductor pattern 121 arranged on a rear surface 100b of the insulating substrate 100 constitutes a second connection member of the other of the first and the second interlayer connection members 130 and 140.

If a heat flux passes through a heat flux sensor 10 in the thickness direction of the heat flux sensor 10, a temperature difference occurs between the first connection portion of one of the first and the second interlayer connection members 130 and 140 and the second connection portion of the other of the first and the second interlayer connection members 130 and 140. This causes Seebeck effect, and the Seebeck effect generates thermoelectric power across the first and the second interlayer connection members 130 and 140. The heat flux sensor 10 outputs a sensor signal representing the thermoelectric power as a voltage.

Next, the following describes heat flux changes over time while the air cylinder 20 operates normally.

Normal Example 1

As illustrated in FIG. 4A to FIG. 4D, a normal example 1 shows a case where an expansion and contraction direction of the air cylinder 20 (that is, a moving direction of the piston 24) is a horizontal direction, and a state of the air cylinder 20 changes from a compressed state to an expanded state.

Heat flux changes in this case respectively show waveforms illustrated in FIG. 5. The horizontal axis of FIG. 5 represents a period that has elapsed since the start of supplying compressed air into the air cylinder 20. The vertical axis of FIG. 5 represents the magnitude of each of the heat fluxes measured by the corresponding one of the first heat flux sensor 10a and the second heat flux sensor 10b. The direction in which a heat flux flows from the inside of a chamber to the outside represents the positive "+" direction, and the direction in which a heat flux flows from the outside of a chamber to the inside represents the negative "−" direction. Periods P1, P2, P3 and P4 in FIG. 5 respectively correspond to the states of the air cylinder 20 respectively illustrated in FIG. 4A, FIG. 4B, FIG. 4C, and FIG. 4D.

Figure 4A:
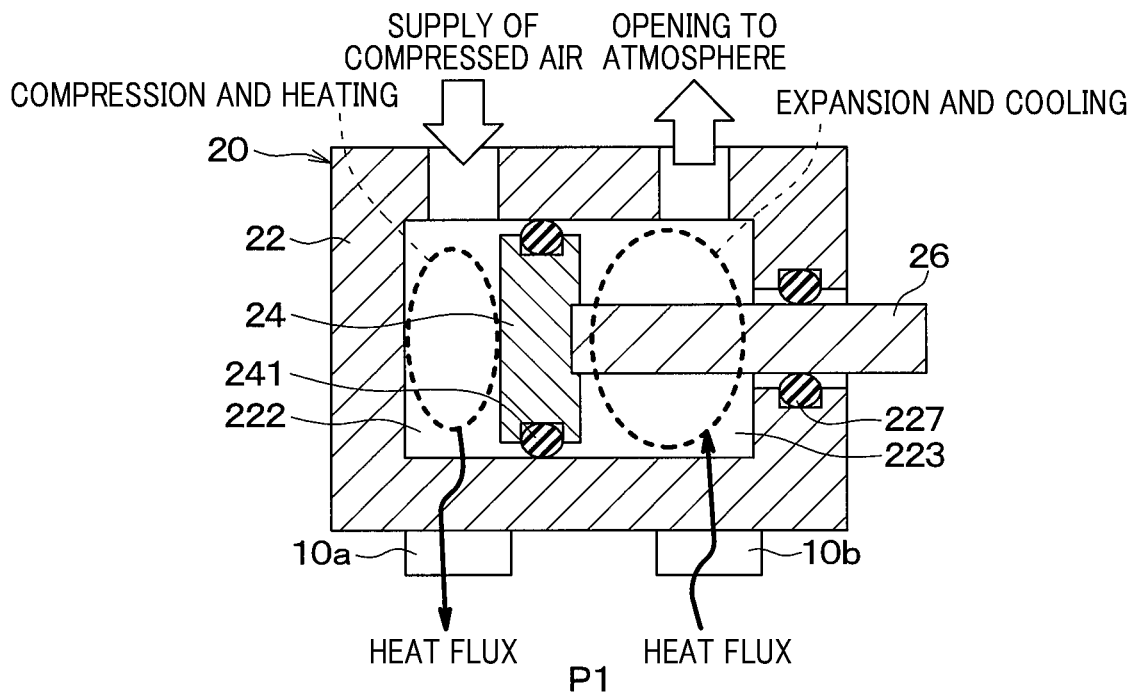
FIG. 4A is a cross-sectional view of the air cylinder in a period P1 according to a normal example 1 of the first embodiment.

In the period P1, as illustrated in FIG. 4A, because the air cylinder 20 is put into an expanded state from a compressed state, compressed air is supplied to the first chamber 222, and the second chamber 223 is open to the atmosphere. At this time, the second chamber 223 is put into a state where the second chamber 223 is open to the atmosphere from a state where compressed air, which was supplied into the second chamber 223 when the air cylinder 20 was changed to the compressed state from the expanded state, has existed in the second chamber 223.

In the period P1, the piston 24 does not start to move by static friction of the seal members 241 and 227. An increase in the pressure in the first chamber 222 causes air in the first chamber 222 to be compressed and heated, resulting in a heat flux from the inside of the first chamber to the outside increasing. This increases the heat flux measured by the first heat flux sensor 10a (hereinafter, referred to as a first heat flux) in the positive direction.

In contrast, a decrease in the pressure in the second chamber 223 based on the opening of the second chamber 223 to the atmosphere causes air in the first chamber 222 to be expanded and cooled, resulting in a heat flux from the outside to the inside of the second chamber 223 increasing. This causes the heat flux, which is measured by the second heat flux sensor 10b (hereinafter, referred to as a second heat flux) to become a negative (minus) value, and also causes the absolute value of the second heat flux to increase in the negative direction.

Figure 4B:
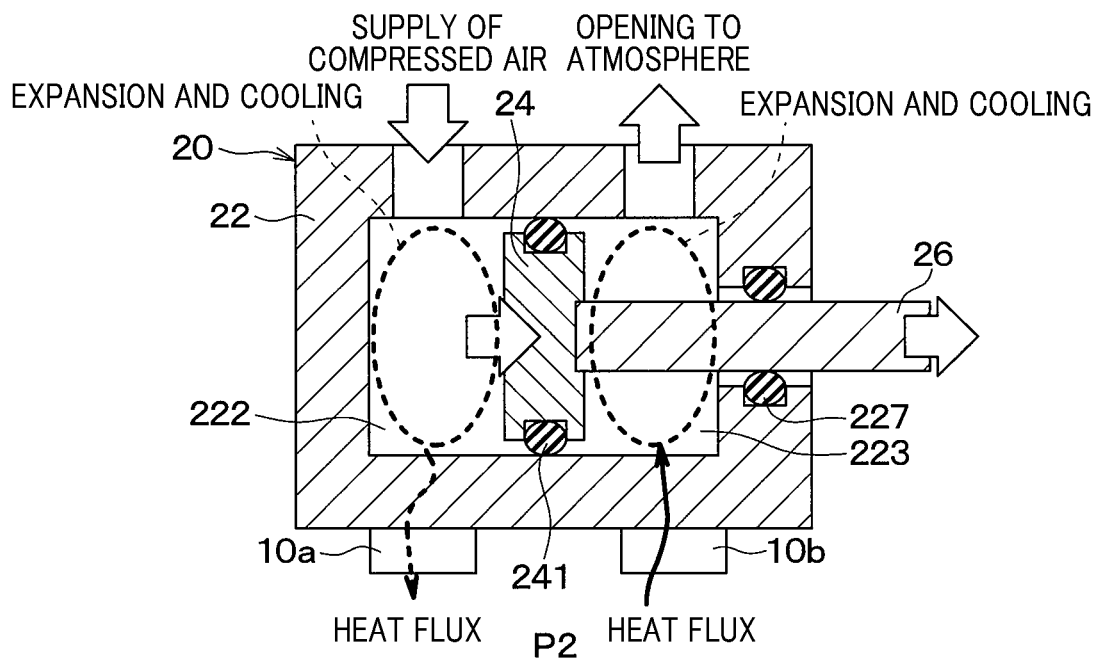
FIG. 4B is a cross-sectional view of the air cylinder in a period P2 according to the normal example 1 of the first embodiment.

In the period P2, as illustrated in FIG. 4B, the pressure difference between the first chamber 222 and the second chamber 223 increases, so that the piston 24 starts to move. As a result of the piston 24 starting to move, air in the first chamber 222 is expanded, so that the pressure in the first chamber 222 decreases, resulting in air in the first chamber 222 being cooled. This causes the first heat flux to decrease. In contrast, because air in the second chamber 223 is compressed, the pressure moderately decreases. The second heat flux therefore moderately changes.

In the period P3, as illustrated in FIG. 4C, the piston 24 is stopped by a first stopper which is not illustrated. This causes expansion of air in the first chamber 222 to be stopped, and the pressure in the first chamber 222 to increase again. As a result of air being compressed and heated, the first heat flux increases in the positive direction.

In contrast, as a result of the piston 24 being stopped, compression of air in the second chamber 223 is also stopped, resulting in the pressure in the second chamber 223 further decreasing. This causes the absolute value of the second heat flux to rapidly increase in the negative direction.

In the period P4, as illustrated in FIG. 4D, compressed air is supplied until the pressure in the first chamber 222 becomes a predetermined pressure. When the pressure in the first chamber 222 becomes the predetermined pressure, supply of the compressed air is stopped. This causes heating of air in the first chamber 222 to be saturated, and the first heat flux to gradually decrease down to be close to zero. The state of the second chamber 223 approaches the state of an atmospheric pressure, resulting in the second heat flux gradually decreasing down to be close to zero.

Normal Example 2

As illustrated in FIG. 6A to FIG. 6D, a normal example 2 shows a case where the expansion and contraction direction of the air cylinder 20 is the horizontal direction, and the state of the air cylinder 20 changes from an expanded state to a contracted state.

Heat flux changes in this case respectively show waveforms illustrated in FIG. 7. The horizontal axis of FIG. 7 indicates a period that has elapsed since the start of supply of compressed air into the air cylinder 20. The vertical axis of FIG. 7 is the same as the vertical axis of FIG. 5. Additionally, periods P5, P6, P7 and P8 in FIG. 7 respectively correspond to the states of the air cylinder 20 illustrated in FIG. 6A, FIG. 6B, FIG. 6C, and FIG. 6D.

Figure 6A:
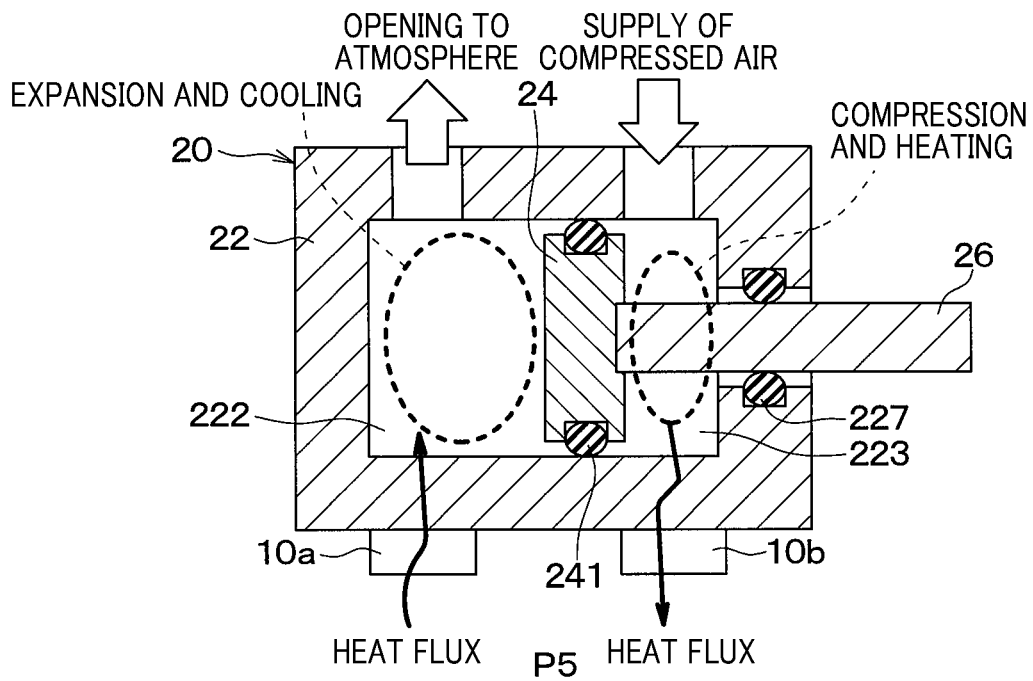
FIG. 6A is a cross-sectional view of the air cylinder in a period P5 according to a normal example 2 of the first embodiment.
Figure 6B:
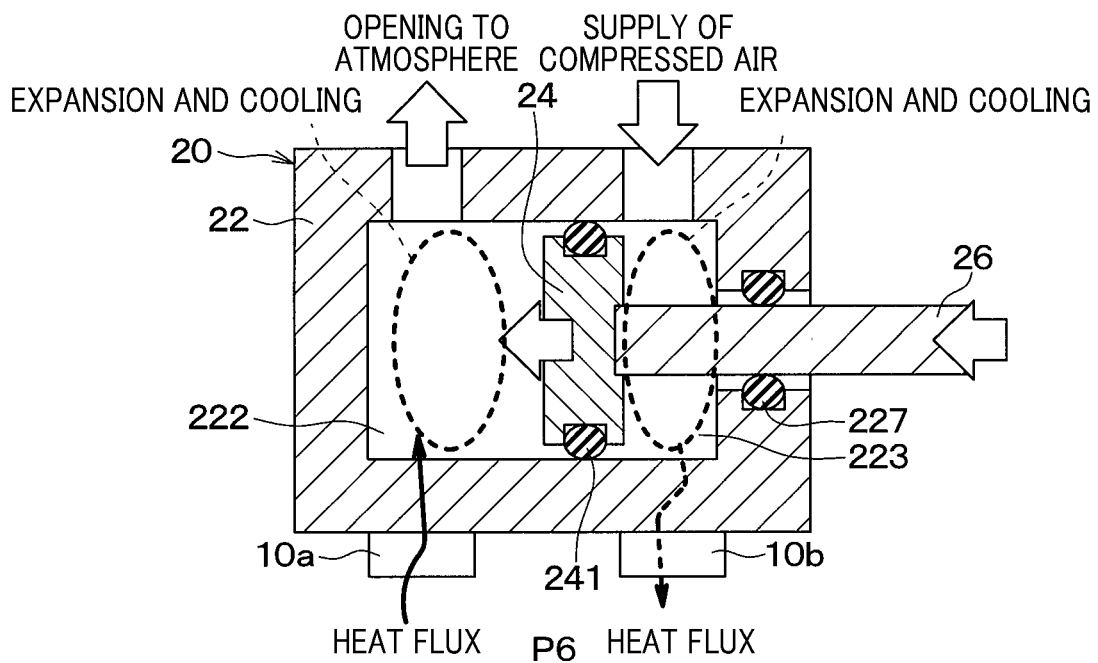
FIG. 6B is a cross-sectional view of the air cylinder in a period P6 according to the normal example 2 of the first embodiment.

In the period P5, as illustrated in FIG. 6A, because the air cylinder 20 is put into a compressed state from an expanded state, compressed air is supplied to the second chamber 223, and the first chamber 222 is open to the atmosphere. In the period P6, as illustrated in FIG. 6B, the pressure difference between the first chamber 222 and the second chamber 223 increases, so that the piston 24 starts to move. In the period P7, as illustrated in FIG. 6C, the piston 24 is stopped by a second stopper which is not illustrated. In the period P8, as illustrated in FIG. 6D, compressed air is supplied until the pressure in the second chamber 223 becomes a predetermined pressure. When the pressure in the second chamber 223 becomes the predetermined pressure, supply of the compressed air is stopped.

Movement of the piston 24 in the normal example 2 becomes opposite to movement of the piston 24 in the normal example 1. As illustrated in FIG. 7, the relationship between the waveform of the first heat flux and the waveform of the second heat flux in the normal example 2 is opposite to the relationship between the waveform of the first heat flux and the waveform of the second heat flux in the normal example 1. That is, the waveform of the first heat flux in the normal example 2 is the same as the waveform of the second heat flux in the normal example 1. The waveform of the second heat flux in the normal example 2 is the same as the waveform of the first heat flux in the normal example 1.

Normal Example 3

As illustrated in FIG. 8A to FIG. 8D, a normal example 3 shows a case where the expansion and contraction direction of the air cylinder 20 is the horizontal direction, and the air cylinder 20 presses a work 30 when the air cylinder 20 is stretched.

Heat flux changes in this case respectively show waveforms illustrated in FIG. 9. The horizontal axis and vertical axis in FIG. 9 are respectively the same as the horizontal axis and the vertical axis in FIG. 5. Additionally, periods P11, P12, P13 and P14 in FIG. 9 respectively correspond to the states of the air cylinder 20 illustrated in FIG. 8A, FIG. 8B, FIG. 8C, and FIG. 8D.

In the period P11, as illustrated in FIG. 8A, as in the period P1 in the normal example 1, compressed air is supplied to the first chamber 222, and the second chamber 223 is open to the atmosphere. Then, as in the period P1 in the normal example 1, the piston 24 starts to move. In the period P11, the first heat flux has a waveform similar to the waveform in the period P1 in the normal example 1, and the second heat flux has a waveform similar to the waveform in the period P2 in the normal example 1.

In the period P12, as illustrated in FIG. 8B, the piston rod 26 contacts the work 30, so that the piston 24 is stopped. While the work 30 is continuously being stopped by static friction, the pressure in the first chamber 222 increases. This causes air in the first chamber 222 to be compressed and heated. This results in the first heat flux increasing in the positive direction.

In contrast, opening of the second chamber 223 to the atmosphere causes the pressure in the second chamber 223 to further decrease, resulting in the absolute value of the second heat flux rapidly increasing in the negative direction.

Figure 8C:
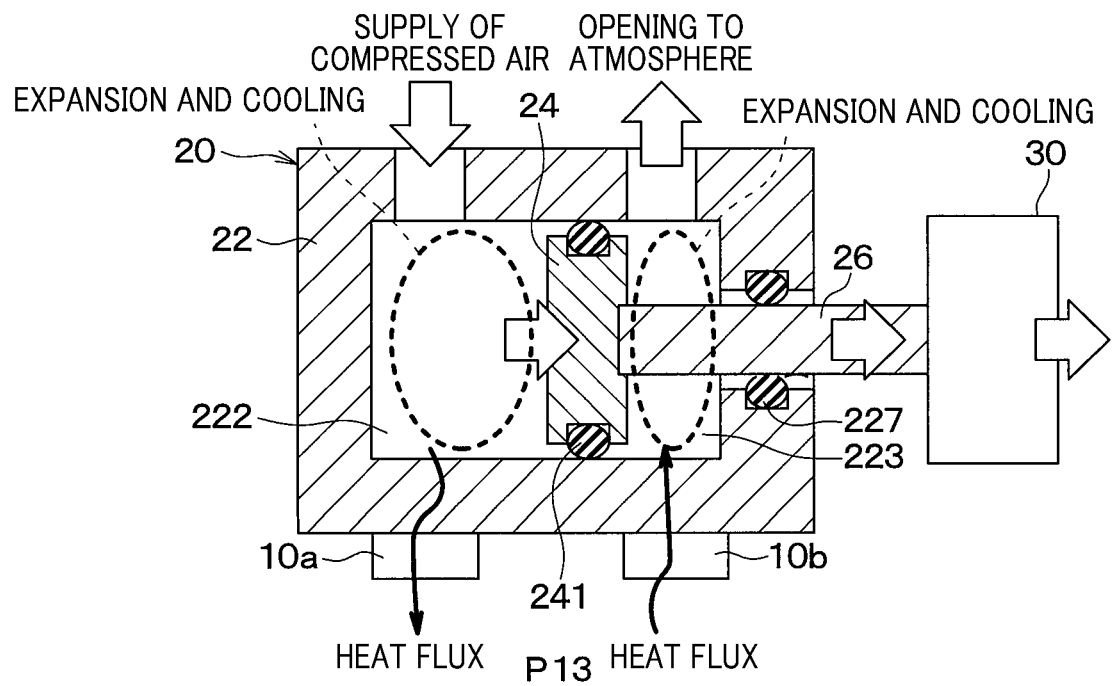
FIG. 8C is a cross-sectional view of the air cylinder in a period P13 according to the normal example 3 of the first embodiment.
Figure 8D:
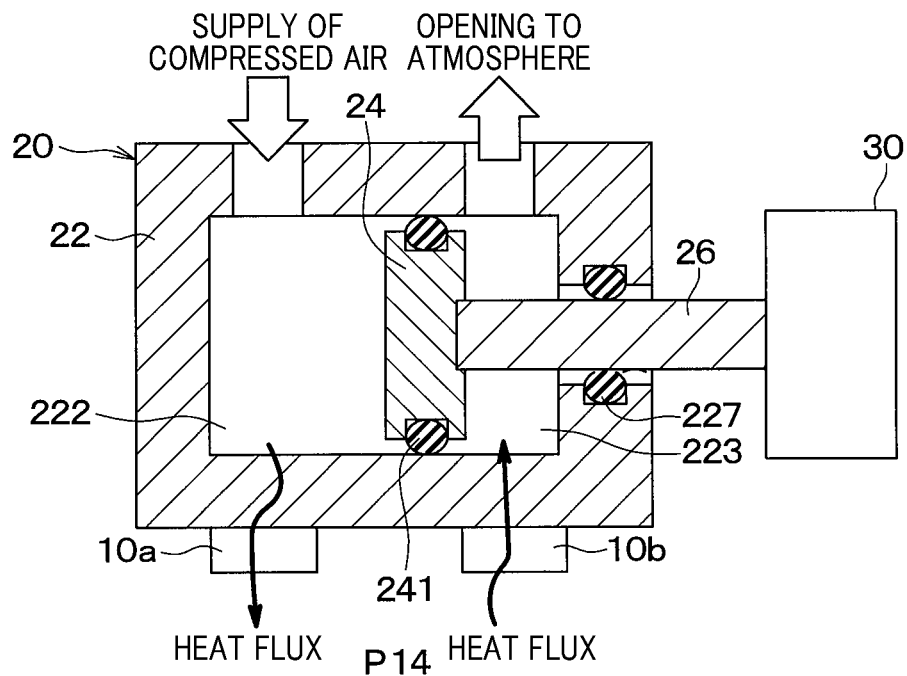
FIG. 8D is a cross-sectional view of the air cylinder in a period P14 according to the normal example 3 of the first embodiment.

In the period P13, as illustrated in FIG. 8C, the work 30 starts to move. As a result of the work 30, that is, the piston 24, starting to move, air in the first chamber 222 is expanded, so that the pressure in the first chamber 222 decreases. This causes air in the first chamber 222 to be cooled, resulting in the first heat flux decreasing. In contrast, because air in the second chamber 223 is compressed, the pressure in the second chamber 223 moderately decreases. Change of the second heat flux therefore becomes moderate.

In the period P14, as in the period P3 in the normal example 1, the piston 24 is stopped by the unillustrated first stopper. Subsequently, as in the period P4 in the normal example 1, supply of the compressed air is stopped. This results in, in the period P14, the first heat flux having a waveform similar to the waveform in the period P3 in the normal example 1, and the second heat flux having a waveform similar to the waveform in the period P4 in the normal example 1.

Next, the following describes heat flux changes over time when an abnormality has occurred in operations of the air cylinder.

Abnormal Example 1

Figure 10:
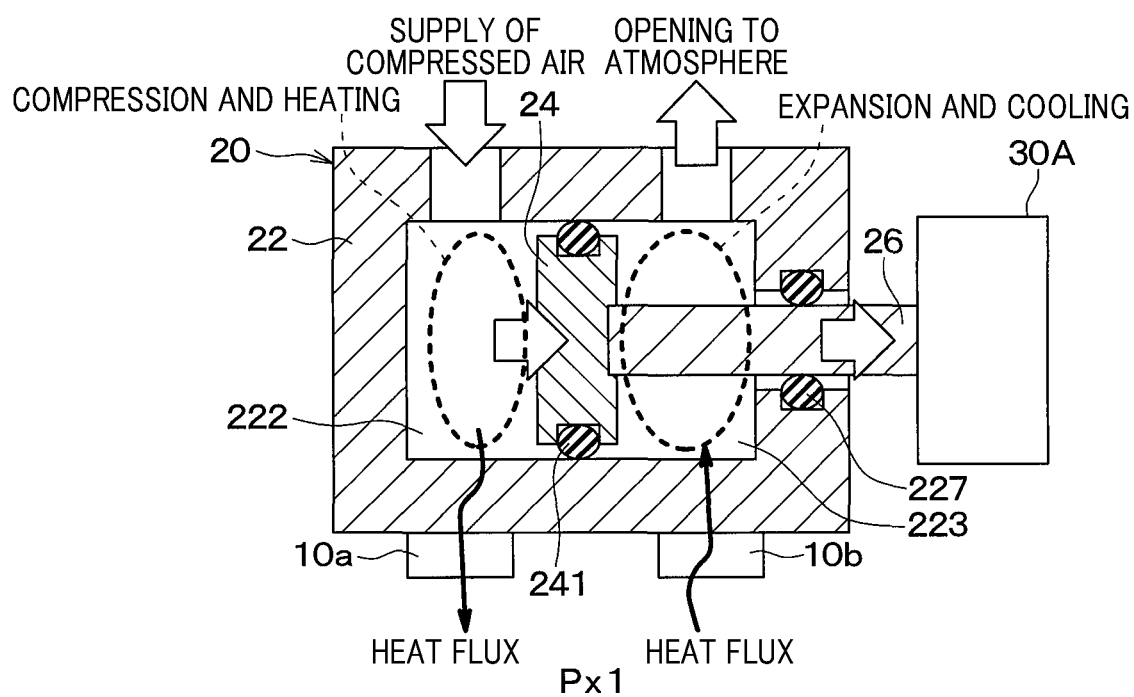
FIG. 10 is a cross-sectional view of the air cylinder in a period Px1 according to an abnormal example 1 of the first embodiment.

An abnormal example 1 represents an abnormal example corresponding to the normal example 1. As illustrated in FIG. 10, the abnormal example 1 shows a case where the air cylinder 20 collides with a foreign substance 30A while the state of the air cylinder 20 changes from a contracted state to an expanded state. Heat flux changes in this case respectively show waveforms illustrated in FIG. 11.

Figure 11:
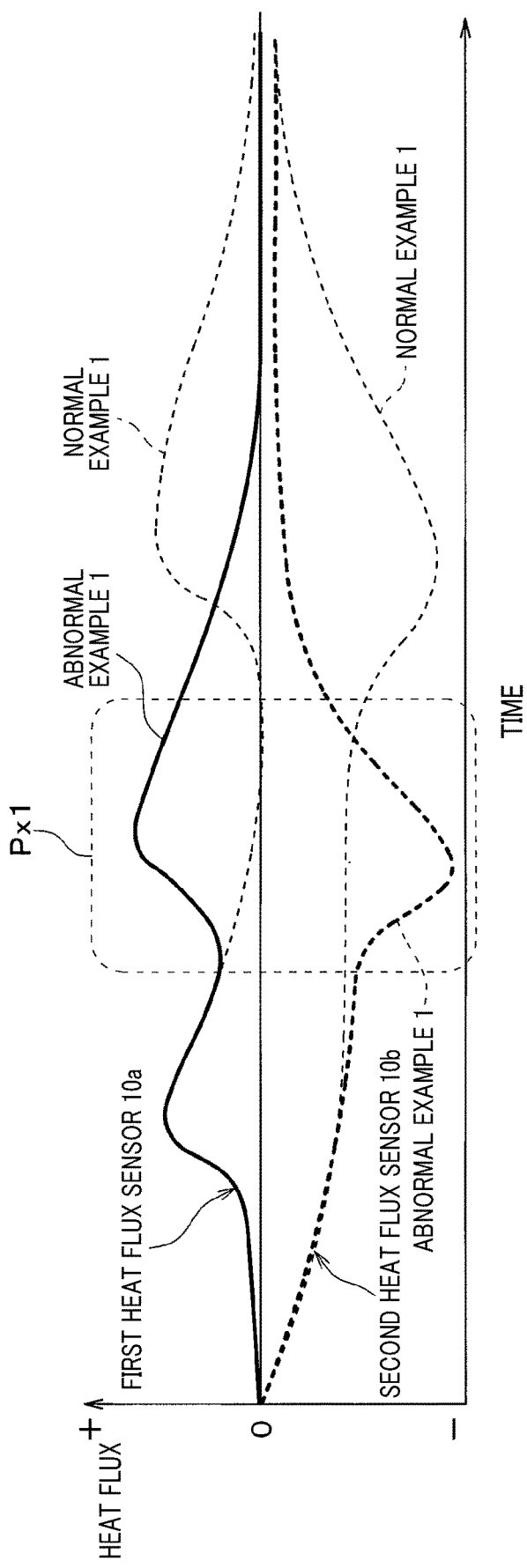
FIG. 11 is a diagram illustrating change of a heat flux over time according to the abnormal example 1 of the first embodiment.

In a period Px1 in FIG. 11, as illustrated in FIG. 10, the piston rod 26 collides with the foreign substance, resulting in an increase of the pressure in the first chamber 222, that is, air being compressed and heated. In the period Px1, the first heat flux increases in the positive direction.

In contrast, in the period Px1, opening of the second chamber 223 to the atmosphere causes the pressure in the second chamber 223 to further decrease. That is, expansion of the air causes the air to be rapidly cooled, resulting in the absolute value of the second heat flux increasing in the negative direction.

As illustrated in FIG. 11, the waveforms of the heat fluxes in the abnormal example 1 are different from the waveforms of the heat fluxes in the normal example 1 illustrated in FIG. 5.

Abnormal Example 2

Figure 12:
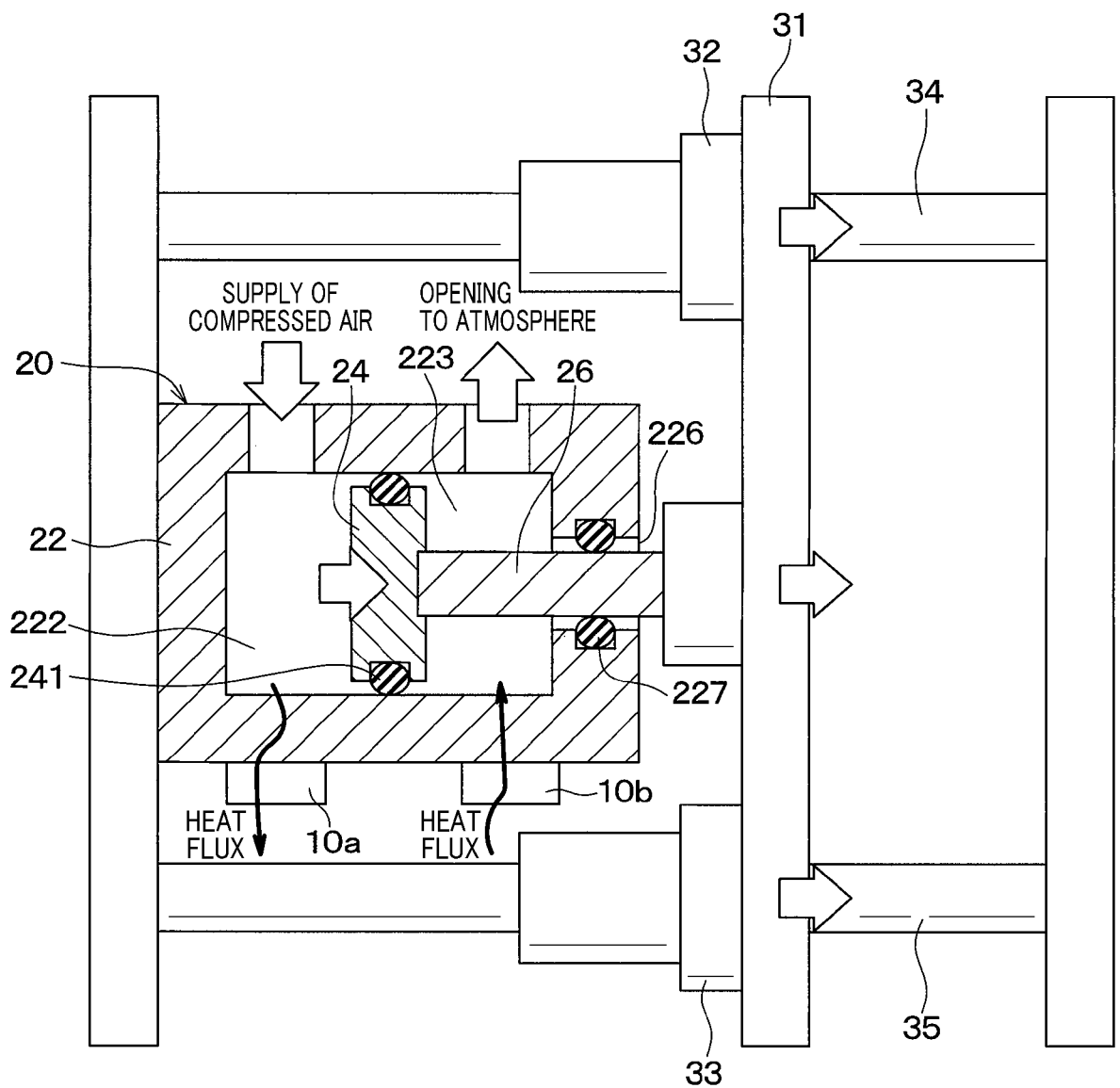
FIG. 12 is a cross-sectional view of the air cylinder according to an abnormal example 2 of the first embodiment.

An abnormal example 2 represents an abnormal example corresponding to the normal example 1. As illustrated in FIG. 12, the abnormal example 2 shows a case where, upon the air cylinder 20 moving a movable plate 31, movement of the piston 24 is delayed by sliding frictional resistance.

The movable plate 31 is configured to move along two rods 34 and 35 via linear bushings 32 and 33. The linear bushings 32 and 33 serve as guide members configured to move along the two rods, which serve respectively as linear members. The linear bushings 32 and 33 are fixed to the movable plate 31. The movable plate 31 is fixed to the piston rod 26. Movement of the piston rod 26 causes the movable plate 31 to move.

A lubricant has been applied between the linear bushing 32 and the rod 34, and also has been applied between the linear bushing 33 and the rod 35. If this lubricant degrades, the sliding frictional resistance of the linear bushings 32, 33 becomes large. Therefore, movement of the piston 24 is delayed.

Figure 13:
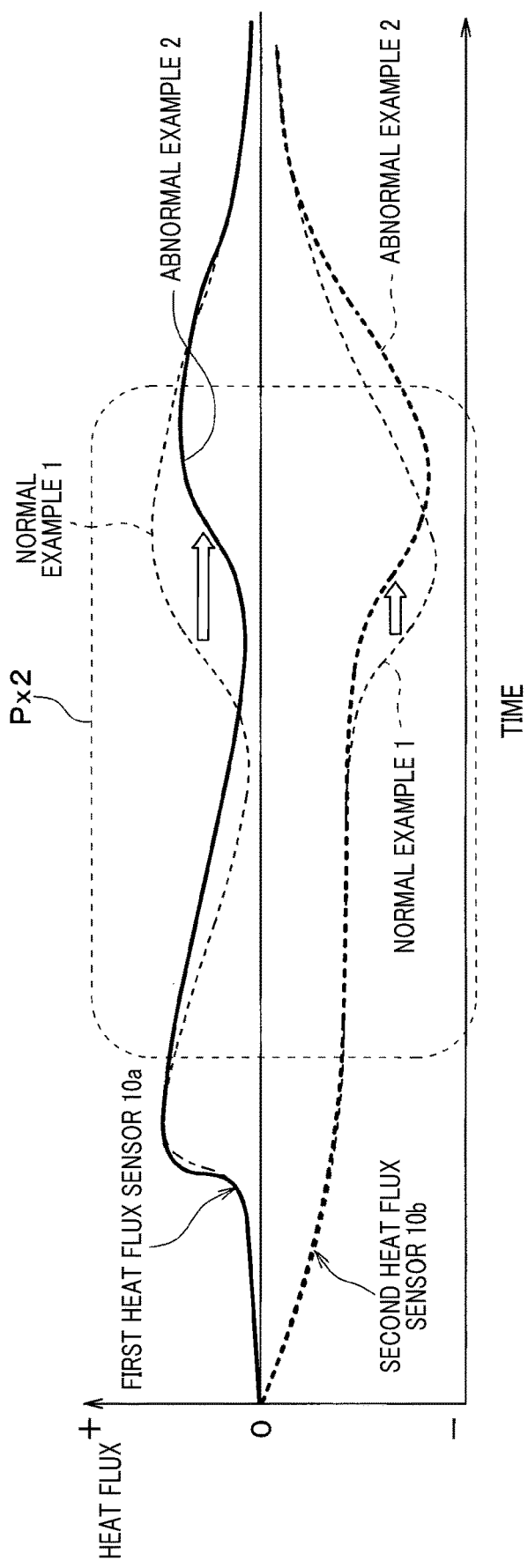
FIG. 13 is a graph illustrating change of a heat flux over time according to the abnormal example 2 of the first embodiment.

Heat flux changes in this case respectively show waveforms illustrated in FIG. 13. An increase in the sliding frictional resistance causes the effect of the air in the first chamber being expansion-cooled based on the movement of the piston 24 to decrease, and time until which the air cylinder 20 is fully stretched to become longer. In a period Px2 in FIG. 13, change of the first heat flux therefore becomes more moderate, and time at which the first heat flux starts to increase becomes later as compared with the normal example 1. In addition, for change of the second heat flux, time at which the absolute value of the second heat flux starts to increase becomes later as compared with the normal example 1.

As illustrated in FIG. 13, the waveforms of the heat fluxes in the abnormal example 2 are different from the corresponding waveforms in the normal example 1 illustrated in FIG. 5.

Abnormal Example 3

Figure 14:
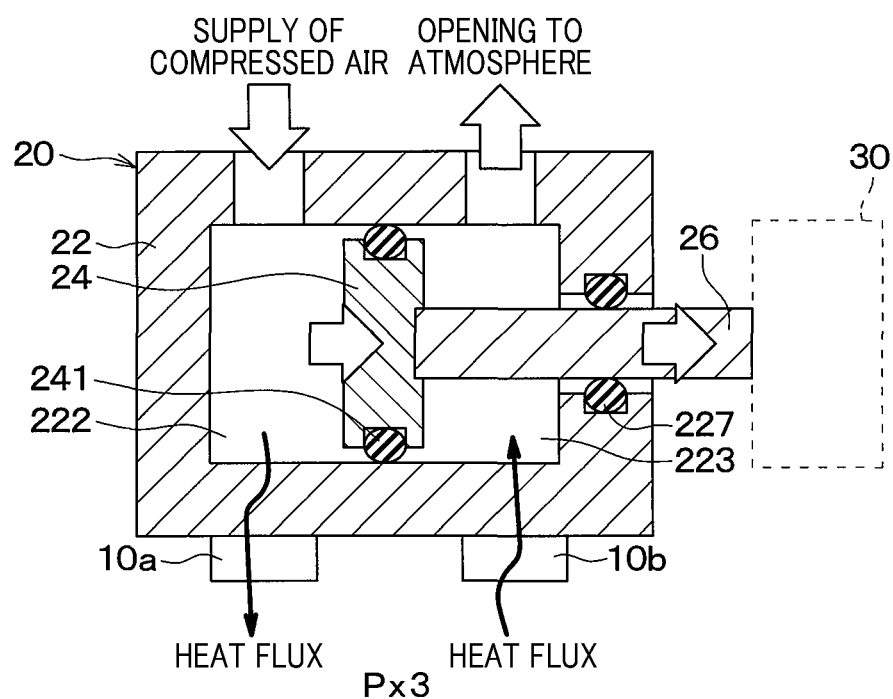
FIG. 14 is a cross-sectional view of the air cylinder according to an abnormal example 3 of the first embodiment.

An abnormal example 3 represents an abnormal example corresponding to the normal example 3. As illustrated in FIG. 14, the abnormal example 3 shows a case where a work 30 that the air cylinder 20 is designed to be stretched to press does not exist due to some kind of facility abnormality. Heat flux changes in this case respectively show waveforms illustrated in FIG. 15.

Figure 15:
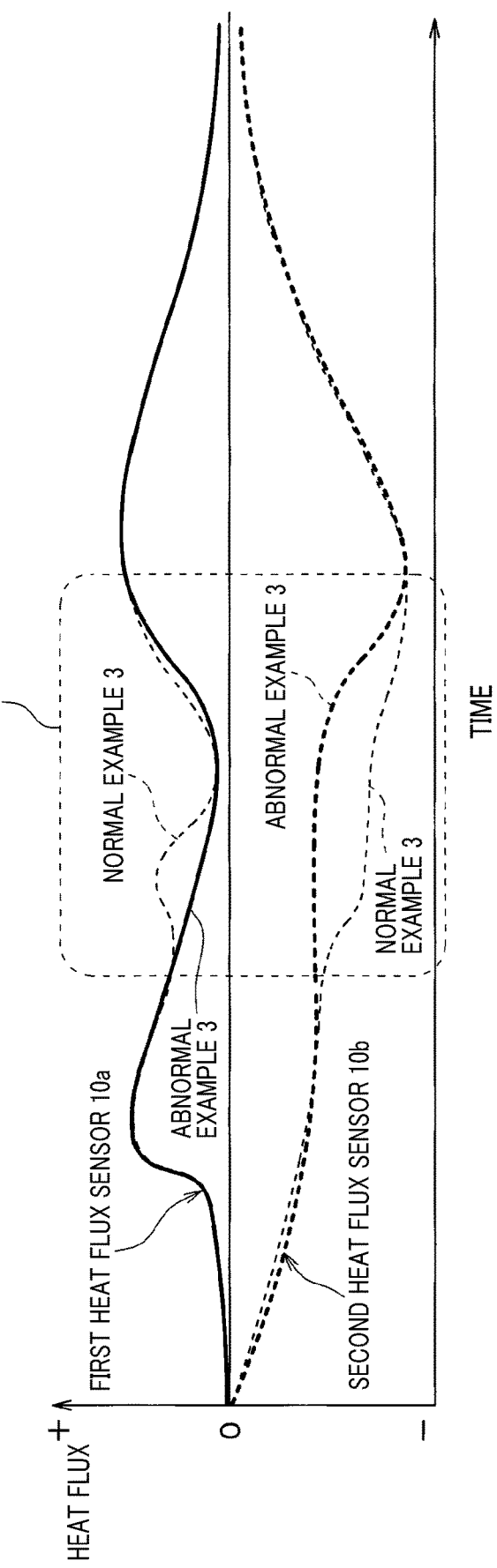
FIG. 15 is a diagram illustrating change of a heat flux over time according to the abnormal example 3 of the first embodiment.

In a Px3 in FIG. 15, because the work 30 does not exist, change of each of the first heat flux and the second heat flux has a waveform of a corresponding one of the first heat flux and the second heat flux in the normal example 1.

Next, the following describes the abnormality diagnosis control performed by the control apparatus 12.

Figure 16:
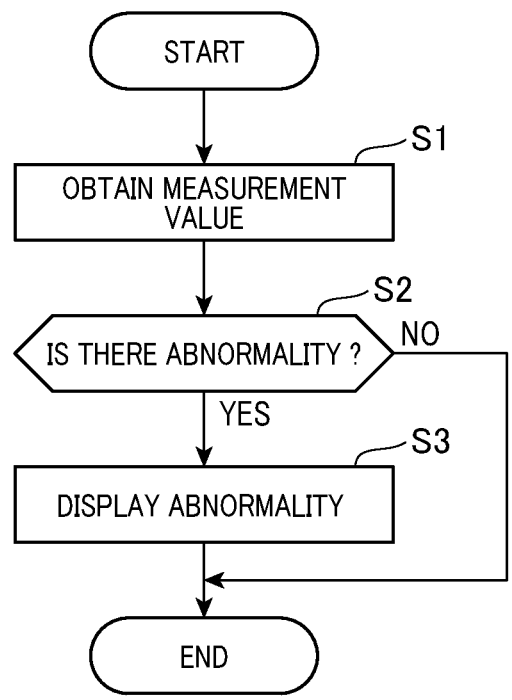
FIG. 16 is a flowchart illustrating abnormality diagnosis control according to the first embodiment.

As illustrated in FIG. 16, the control apparatus 12 performs abnormality diagnosis based on the measurement result of each heat flux sensor 10. Note that each step illustrated in FIG. 16 constitutes a function implementing unit for implementing a corresponding function. In addition, the abnormality diagnosis control illustrated in FIG. 16 is individually performed for each of the first heat flux sensor 10a and the second heat flux sensor 10b. The abnormality diagnosis control using the first heat flux sensor 10a is substantially the same as the abnormality diagnosis control using the second heat flux sensor 10b. The following therefore describes the abnormality diagnosis control using the first heat flux sensor 10a.

Specifically, in step S1, the control apparatus 12 acquires a measurement value of the first heat flux sensor 10a. In step S1, the control apparatus 12 calculates a value of heat flux based on the sensor signal input from the first heat flux sensor 10, that is, a voltage value input from the first heat flux sensor 10a. The control apparatus 12 uses the calculated value of the heat flux as the measurement value. Note that the control apparatus 12 can use the value of the voltage output from the heat flux sensor 10 as the measurement value instead of using the value of the heat flux.

Subsequently, in step S2, the control apparatus 12 compares the measurement value obtained in step S1 with a threshold and determines whether there is an abnormality based on the comparison result. In step S2, the control apparatus 12 compares a measurement value obtained when elapsed time since the start of supplying compressed air into the air cylinder 2 has reached predetermined time with a threshold previously set for the predetermined time. This threshold serves as a criterion for the determination; the threshold has been set in accordance with the predetermined time.

Upon the measurement value being larger than the threshold, or the measurement value being smaller than the threshold, the control apparatus 12 determines that there is an abnormality.

Figure 17:
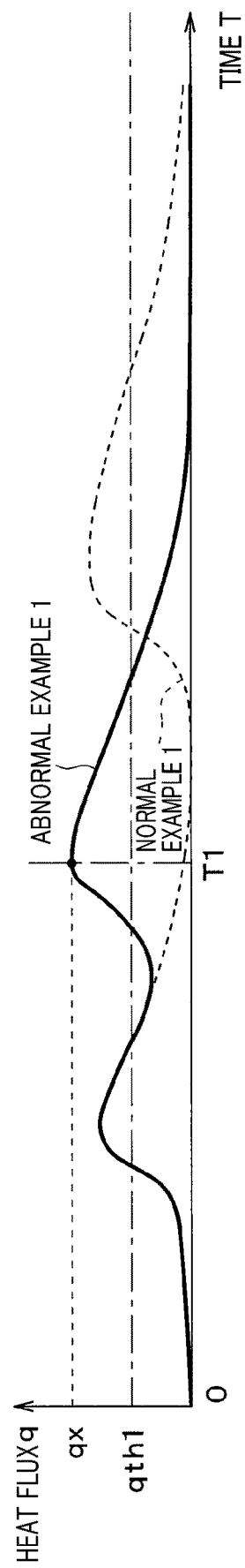
FIG. 17 is a graph for explaining an abnormality determining method according to the first embodiment.

For example, for detecting the abnormal example 1, as illustrated in FIG. 17, the control apparatus 12 compares a measurement value qx at time T1 as the predetermined time with a threshold qth1 previously determined at the time T1.

FIG. 17 illustrates the waveform of the first heat flux in the abnormal example 1 illustrated in FIG. 11 and the waveform of the first heat flux in the normal example 1. When there is an abnormality, the measurement value qx at the time T1 has exceeded the threshold qth1. If the measurement value qx has exceeded the threshold qth1, the control apparatus 12 determines that there is an abnormality.

Figure 18:
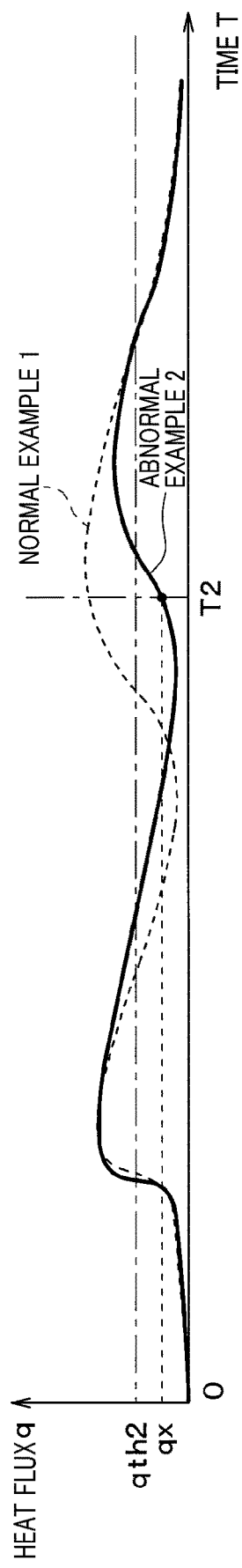
FIG. 18 is a graph for explaining the abnormality determining method according to the first embodiment.

Additionally, for detecting the abnormal example 2, as illustrated in FIG. 18, the control apparatus 12 compares a measurement value qx at time T2 as the predetermined time with a threshold qth2 previously determined at the time T2.

FIG. 18 illustrates the waveform of the first heat flux in the abnormal example 2 illustrated in FIG. 13 and the waveform of the first heat flux in the normal example 1. If there is an abnormality, the measurement value qx at the time T2 has fallen below the threshold qth2. The control apparatus 12 determines that there is an abnormality upon the measurement value qx having fallen below the threshold qth2.

Figure 19:
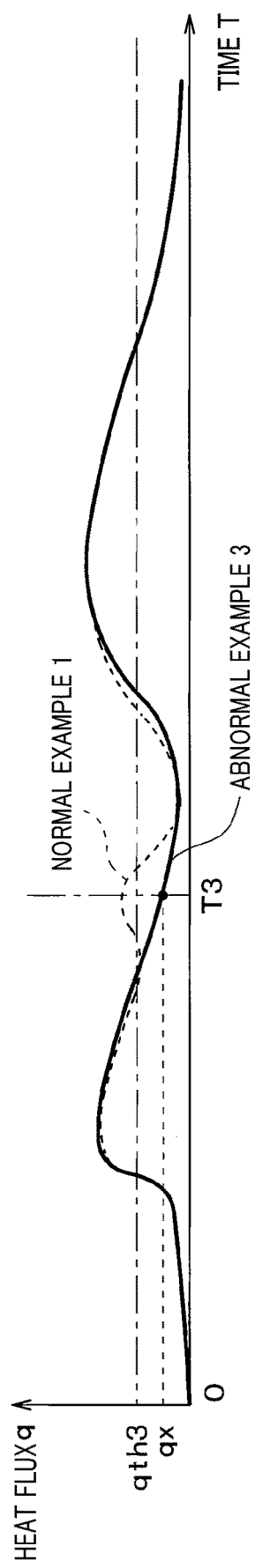
FIG. 19 is a diagram for explaining the abnormality determining method according to the first embodiment.

For detecting the abnormal example 3, as illustrated in FIG. 19, the control apparatus 12 compares a threshold qx at time T3 as the predetermined time with a threshold qth3 previously determined at the time T3.

FIG. 19 illustrates the waveform of the first heat flux in the abnormal example 3 illustrated in FIG. 15 and the waveform of the first heat flux in the normal example 1. When there is an abnormality, the measurement value qx at the time T3 has fallen below the threshold qth3. The control apparatus 12 determines that there is an abnormality upon the measurement value qx having fallen below the threshold qth3.

Note that, in the determination in step S2, the control apparatus 12 can compare measurement values obtained at different predetermined times with the threshold to thereby perform the determination. At that time, each of the predetermined times can be set for a corresponding one of abnormal causes. This makes it possible to specify a cause of the abnormality that has occurred.

For example, the control apparatus 12 can determine whether the measurement value qx at the time T1 in FIG. 17 is higher than the corresponding threshold qth1, and the control apparatus 12 can determine whether the measurement value qx at the time T2 in FIG. 18 is lower than the threshold qth2. Execution of both the determinations enables, if there is an abnormality, which of the abnormality example 1 and the abnormality example 2 is the cause of the abnormality to be specified.

Upon determining that there is an abnormality, the control apparatus 12 outputs, to the display apparatus 14, a control signal for causing the display apparatus 14 to display that there is an abnormality in step S3. This gives, to a maintenance worker, information indicative of the occurrence of an abnormality, making it possible for the maintenance worker to take necessary measures.

As described above, the abnormality diagnosis apparatus 1 of the present embodiment includes the first heat flux sensor 10a, the second heat flux sensor 10b, and the control apparatus 12. The control apparatus 12 compares the measurement result of the first heat flux sensor 10a with the corresponding criterion to thereby determine whether there is a malfunction in the air cylinder 20. Additionally, the control apparatus 12 compares the measurement result of the second heat flux sensor 10b with the corresponding criterion to thereby determine whether there is a malfunction in the air cylinder 20.

As described above, while the air cylinder 20 is operating, the air in each of the first and second chambers 222 and 223 is compressed or expanded. This causes the state of the air to be changed inside the corresponding one of the first and second chambers 222 and 223.

The change of the air in each of the first and second chambers 222 and 223 causes the heat flux between the inside and outside of the corresponding one of the first and second chambers 222 and 223 to be changed. From this viewpoint, the first heat flux sensor 10a is configured to measure the heat flux between the inside and outside of the first chamber 222, and the second heat flux sensor 10b is configured to measure the heat flux between the inside and outside of the second chamber 223. Then, the control apparatus 12 compares each of the measurement results with the corresponding one of the criteria to thereby determine whether there is an abnormality in the air cylinder 20.

Note that comparing each of the measurement results with the corresponding one of the criteria to thereby perform abnormality determination is equivalent to determining the pressure state of air in each of the first and second chambers 222 and 223.

In addition, the first heat flux sensor 10a, which is located outside the first chamber 222, is capable of measuring the heat flux between the inside and outside of the first chamber 222 without any hole being formed through a wall of the first chamber 222. Similarly, the second heat flux sensor 10b, which is located outside the second chamber 223, is capable of measuring the heat flux between the inside and outside of the second chamber 223 without any hole being formed through a wall of the second chamber 223. The abnormality diagnosis apparatus 1 of the present embodiment therefore makes it possible to eliminate the need to form a hole through a wall of each of the first and second chambers 222 and 223.

On the other hand, there is an abnormality diagnosis method using a position sensor for measuring the position of the piston 24, which is different from the method carried out by the abnormality diagnosis apparatus 1 of the present embodiment. The position sensor is a magnetic sensor, and typically referred to as an auto switch.

Specifically, the abnormality diagnosis method measures time required for the piston 24 to have reached a predetermined stop position since the start of movement of the piston 24 using the auto switch and a timer. Then, the abnormality diagnosis method compares the measured time with predetermined time, and determines that there is an abnormality upon determining that the measured time is longer or shorter than the predetermined time.

The abnormality diagnosis method using the position sensor however cannot determine, even if an abnormality has occurred during movement of the piston 24, the occurrence of such an abnormality in a case where the time required for the piston 24 to have reached the predetermined stop position in the abnormal state of the piston 24 is identical to the time required for the piston 24 to have reached the predetermined stop position in a normal state of the piston 24.

In contrast, the abnormality diagnosis apparatus 1 of the present embodiment diagnoses whether there is an abnormality based on the measurement result of each heat flux sensor 10. If there is an abnormality during movement of the piston 24, change of each heat flux is different from change of the corresponding heat flux during normal movement of the piston 24.

The abnormality diagnosis apparatus 1 of the present embodiment therefore makes it possible to determine that, in a case where an abnormality has occurred during movement of the piston 24, the occurrence of such an abnormality even if the time required for the piston 24 to have reached the predetermined stop position after the occurrence of such an abnormality is identical to the time required for the piston 24 to have reached the predetermined stop position in a normal state of the piston 24.

The abnormality determination task carried out by the abnormality diagnosis apparatus 1 of the present embodiment is usable for determination of whether initial setting of the air cylinder 20 is appropriate. For example, in the case where a faulty air cylinder 20 is replaced with a new air cylinder 20, it is necessary to adjust a flow regulating valve so that the movement speed of the piston 24 of the new air cylinder 20 becomes identical with the movement speed of the piston 24 of the faulty air cylinder 20. For addressing such necessity, after adjustment of the flow regulating valve, the abnormality diagnosis apparatus 1 of the present embodiment performs the above-described abnormality diagnosis task. This makes it possible to determine whether adjustment of the flow regulating valve is appropriate. It is therefore possible to achieve repeatability of the moving speed of the piston 24.

The abnormality diagnosis performed by the abnormality diagnosis apparatus 1 of the present embodiment can be utilized in determining whether the assembly of a sliding mechanism into an apparatus configured to move the sliding mechanism with the air cylinder 20 is appropriate.

For example, in assembly of an apparatus in which the air cylinder 20 moves the movable plate described in the above-described abnormal example 2, it is necessary to obtain parallelism between the two rods. If this parallelism were not obtained, sliding resistance between the linear bushing and the two rods would become larger, resulting in change of each heat flux becoming the waveform in the abnormal example 2. For addressing such a problem, after assembly of the sliding mechanism into the apparatus configured to move the sliding mechanism with the air cylinder 20, the abnormality diagnosis apparatus 1 of the present embodiment performs the above-described abnormality diagnosis task. This makes it possible to determine whether the assembly is appropriate.

Second Embodiment

The abnormality diagnosis apparatus 1 of the present embodiment is different from the abnormality diagnosis apparatus 1 of the first embodiment in the diagnosis target and a position where each heat flux sensor 10 is attached.

Figure 20:
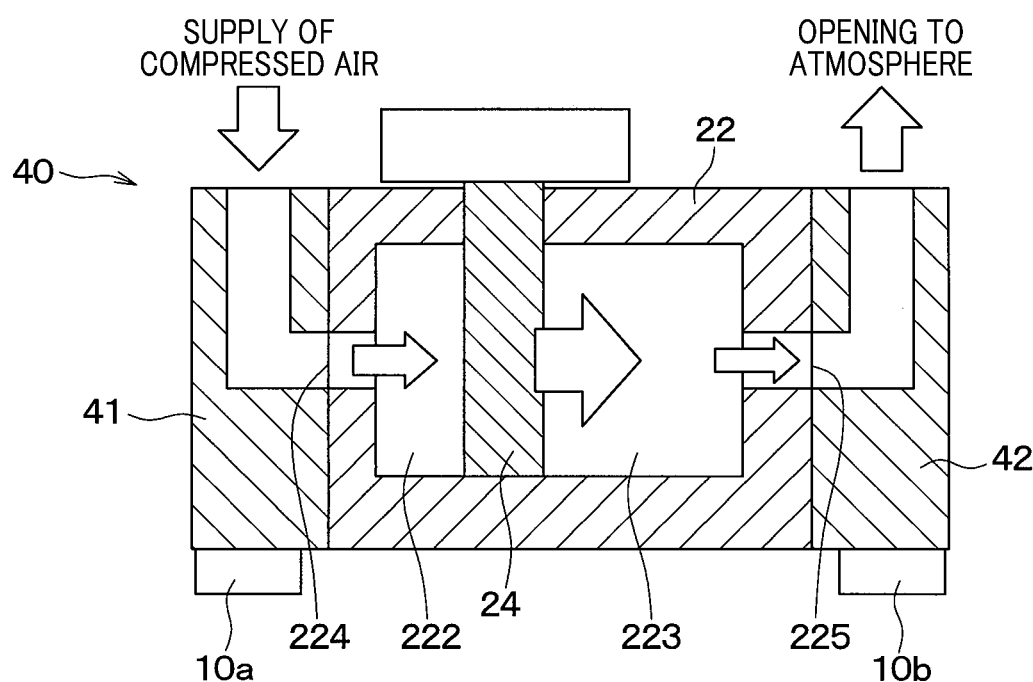
FIG. 20 is a diagram illustrating a heat flux sensor and an air cylinder which are components of an abnormality diagnosis apparatus according to the second embodiment.

As illustrated in FIG. 20, the abnormality diagnosis apparatus 1 of the present embodiment aims to diagnose a rod-less cylinder 40 as the diagnosis target thereof.

The rod-less cylinder 40 includes a first joint block 41 and a second joint block 42 joined to the cylinder 22. The first joint block 41 is configured to connect the first opening 224 to an unillustrated pipe therethrough. The second joint block 42 is configured to connect the second opening 225 to an unillustrated pipe. The first joint block 41 and the second joint block 42 are each made of metal.

Figure 21:
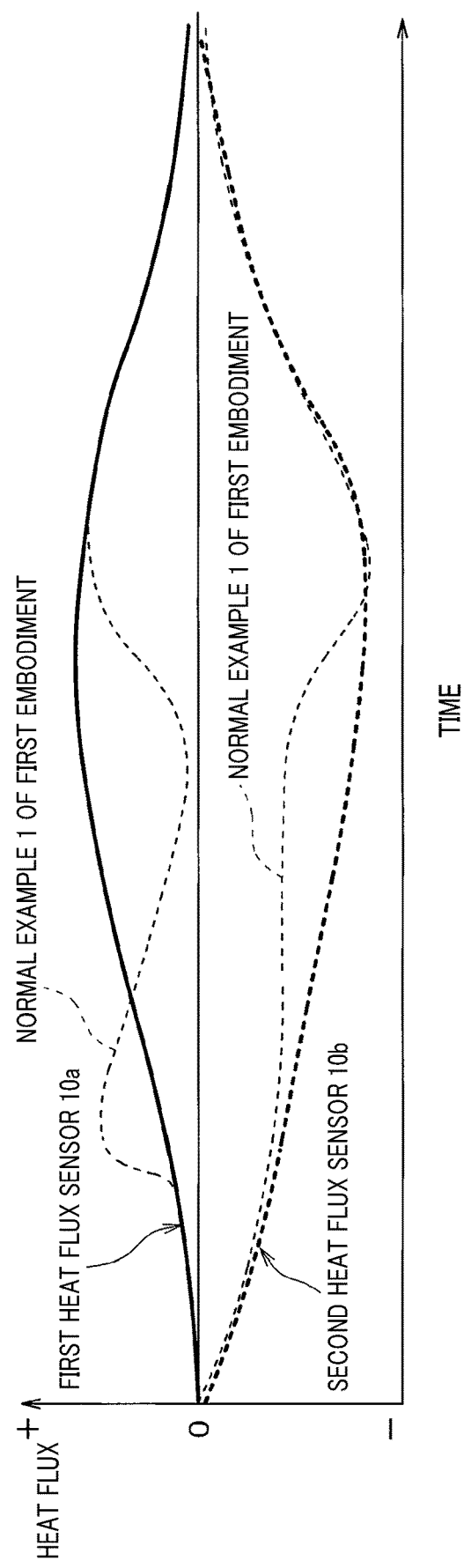
FIG. 21 is a graph illustrating change of a heat flux over time according to a normal example 1 of the second embodiment.

The first heat flux sensor 10a is attached onto the outer surface of the first joint block 41. The second heat flux sensor 10b is attached onto the outer surface of the second joint block 42. Change of the first heat flux and change of the second heat flux in the normal example 1 respectively show waveforms illustrated in FIG. 21. As illustrated in FIG. 21, even if each of the heat flux sensors 10 is located to be separated from the chamber 221 (222, 223) of the cylinder 22, it is possible to detect change of each of the first and second heat fluxes.

As described above, it is possible to measure the heat flux between the inside and outside of the chamber 221 at a location separated from the chamber 221 as long as the location is within the range in which heat is transferrable. The abnormality diagnosis apparatus 1 using each heat flux sensor 10 therefore is designed to have sufficient flexibility of location of each heat flux sensor 10.

Third Embodiment

The abnormality diagnosis apparatus 1 of the third embodiment is configured such that the determination in step S162 of FIG. 16 in the abnormality diagnosis control according to the third embodiment is different from the determination in step S162 of FIG. 16 in the abnormality diagnosis control according to the first embodiment.

The control apparatus 12 of the present embodiment uses time at which the measurement value acquired in step S1 has arrived at the threshold as the measurement result of each heat flux sensor 10. The control apparatus 12 measures the arrival time using a timer to thereby compare the measured arrival time with corresponding determination time defined in advance.

Figure 22:
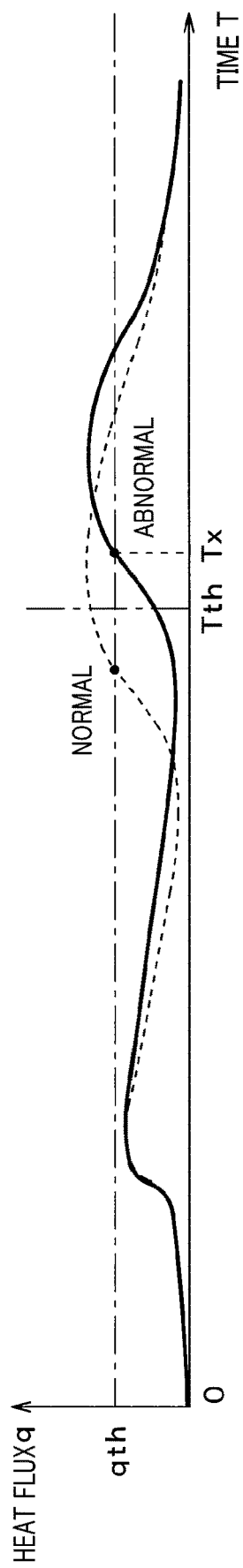
FIG. 22 is a graph for explaining an abnormality determining method according to the third embodiment.

For example, for detecting the abnormal example 2, as illustrated in FIG. 22, the control apparatus 12 compares arrival time Tx at which the measurement value of each heat flux sensor 10 has arrived at the threshold qth with the determination time Tth. The determination time Tth is set in advance based on the waveform of the corresponding heat flux in the normal example 1. In the case where the reach time Tx is later than the determination time Tth, the control apparatus 12 determines that there is an abnormality.

The above configuration enables whether there is an abnormality in the air cylinder 20 to be determined.

Fourth Embodiment

The abnormality diagnosis apparatus 1 of the fourth embodiment is configured such that the determination in step S162 of FIG. 16 in the abnormality diagnosis control according to the fourth embodiment is different from the determination in step S162 of FIG. 16 in the abnormality diagnosis control according to the first or third embodiment.

As illustrated in FIG. 23, the control apparatus 12 uses, as the measurement result of each heat flux sensor 10, the waveform of the corresponding heat flux; the waveform of the corresponding heat flux represents change of the corresponding heat flux with respect to time over the whole one cycle of the air cylinder 20.

One cycle of the air cylinder 20 represents a period during which the piston 24 moves from one of the stopper positions to the other thereof. The control apparatus 12 uses, as the criterion, a determination region set based on the waveform of each heat flux in a normal operation.

The determination region is defined as a region between
(1) An upper limit waveform obtained by shifting upwardly the waveform of the corresponding heat flux in the normal operation by predetermined heat flux values in the vertical axis
(2) A lower limit waveform obtained by shifting downwardly the waveform of the corresponding heat flux in the normal operation by predetermined heat flux values in the vertical axis That is, the control apparatus 12 determines that there is an abnormality upon the detected waveform of the corresponding heat flux extending off the determination region. This also enables whether there is an abnormality in the air cylinder 20 to be determined.

Note that the above determination can be changed as follows. That is, the control apparatus 12 can be configured to
(1) Calculate an integrated value of the difference at each time between the detected waveform of each heat flux and the waveform of the corresponding heat flux prepared in the normal operation
(2) Compare the integrated value with a determination value
(3) Determine that there is an abnormality upon the integrated value exceeding the determination value Fifth Embodiment As illustrated in FIG. 24A to FIG. 24D, the abnormality diagnosis apparatus 1 of the present embodiment is different from that in the first embodiment in that the expansion and contraction direction of the air cylinder 20, which is an abnormality diagnostic target, is the vertical direction.

Heat flux changes upon the air cylinder 20 is expanded and compressed normally in the vertical direction show respective waveforms illustrated in FIG. 25.

The horizontal axis of FIG. 25 represents a period that has elapsed since the start of supplying compressed air into the first chamber 222. The horizontal axis of FIG. 25 represents a period of one cycle during which the air cylinder 20 is stretched and thereafter compressed to return to its original state.

The vertical axis of FIG. 25 is the same as the vertical axis of FIG. 5. In addition, periods P21, P22, P23 and P24 in FIG. 25 respectively correspond to the states of the air cylinder 20 illustrated in FIG. 24A, FIG. 24B, FIG. 24C, and FIG. 24D.

Figure 24A:
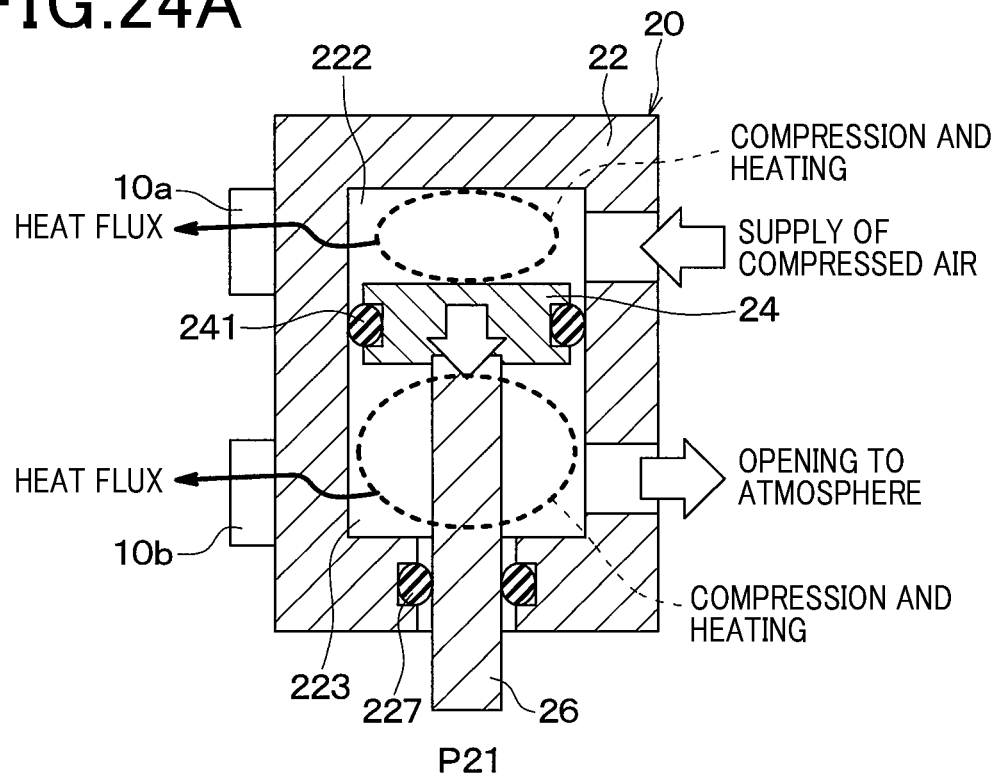
FIG. 24A is a cross-sectional view of an air cylinder in a normal operation period P21 according to the fifth embodiment.

In the period P21 in FIG. 25, as illustrated in FIG. 24A, because the air cylinder 20 is put into the state where the air cylinder 20 is expanded in the downward direction from a compressed state, compressed air is supplied into the first chamber 222, and the second chamber 223 is open to the atmosphere.

Then, the piston 24 starts to move in the downward direction based on an increase of the pressure in the first chamber 222 and the weight of the piston 24 and piston rod 26. Air in the first chamber 222 is compressed and heated until the piston 24 starts to move. When the piston 24 starts to move, air in the first chamber 222 is expanded and cooled.

The first heat flux therefore rapidly increases in the positive direction, and thereafter decreases. As a result of the piston 24 being lowered, the air in the second chamber 223 is momentarily compressed and heated. Then, the pressure in the second chamber 223 further decreases by the second chamber 223 being open to the atmosphere, and air is expanded and cooled. Thereafter, the second heat flux increases in the positive direction, and thereafter decreases to be turn to the negative direction.

Figure 24B:
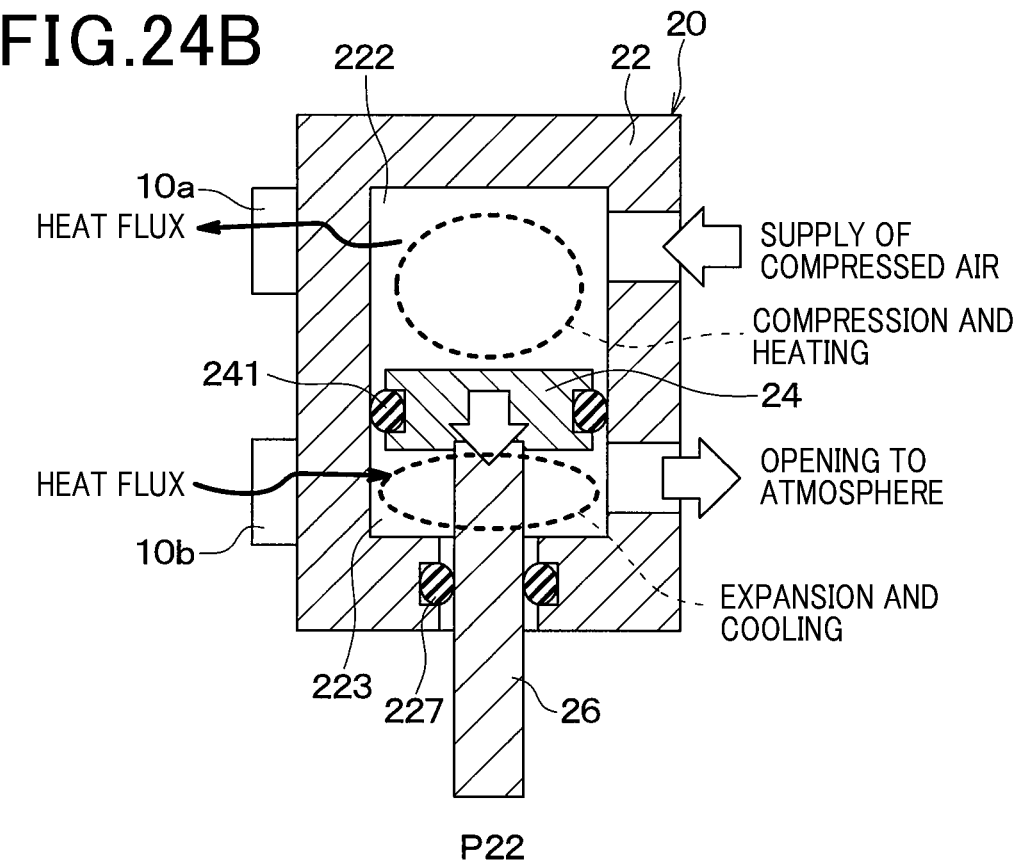
FIG. 24B is a cross-sectional view of the air cylinder in a normal operation period P22 according to the fifth embodiment.

In the period P22, as illustrated in FIG. 24B, the piston 24 is stopped by a third stopper which is not illustrated. Then, the pressure in the first chamber 222 becomes constant at a predetermined pressure. This causes heating of the air in the first chamber 222 to be saturated, resulting in the first heat flux gradually decreasing to be close to zero. The state of the second chamber 223 becomes the state of atmospheric pressure, resulting in the second heat flux gradually decreasing to be close to zero.

Figure 24C:
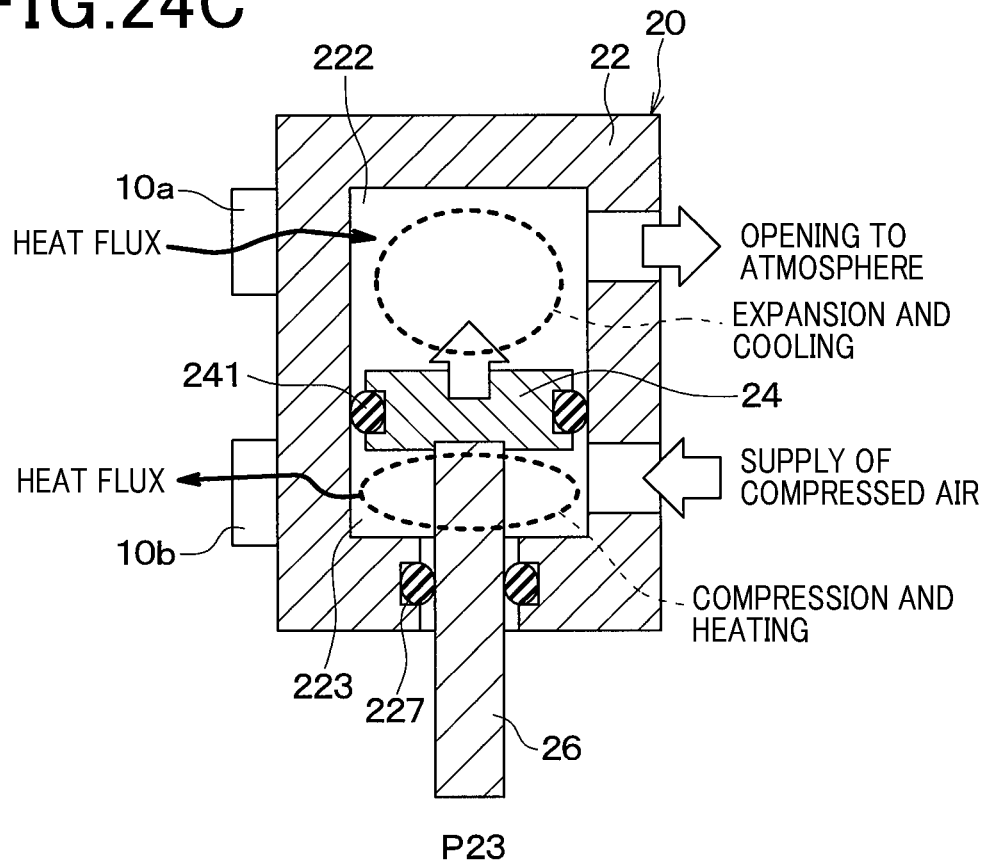
FIG. 24C is a cross-sectional view of the air cylinder in a normal operation period P23 according to the fifth embodiment.

In the period P23, as illustrated in FIG. 24C, because the air cylinder 20 is put into a compressed state from an expanded state, compressed air is supplied into the second chamber 223, and the first chamber 222 is open to the atmosphere. The piston 24 starts to move upward based on an increase in the pressure in the second chamber 223. The air in the second chamber 223 is compressed and heated until the piston 24 starts to move. When the piston 24 starts to move, the air in the second chamber 223 is expanded and cooled. This causes the second heat flux to rapidly increase in the positive direction and thereafter to decrease. The pressure in the first chamber 222 further decreases by the first chamber 222 being open to the atmosphere, so that the air in the first chamber 222 is expanded and cooled. The absolute value of the first heat flux therefore increases in the negative direction.

Figure 24D:
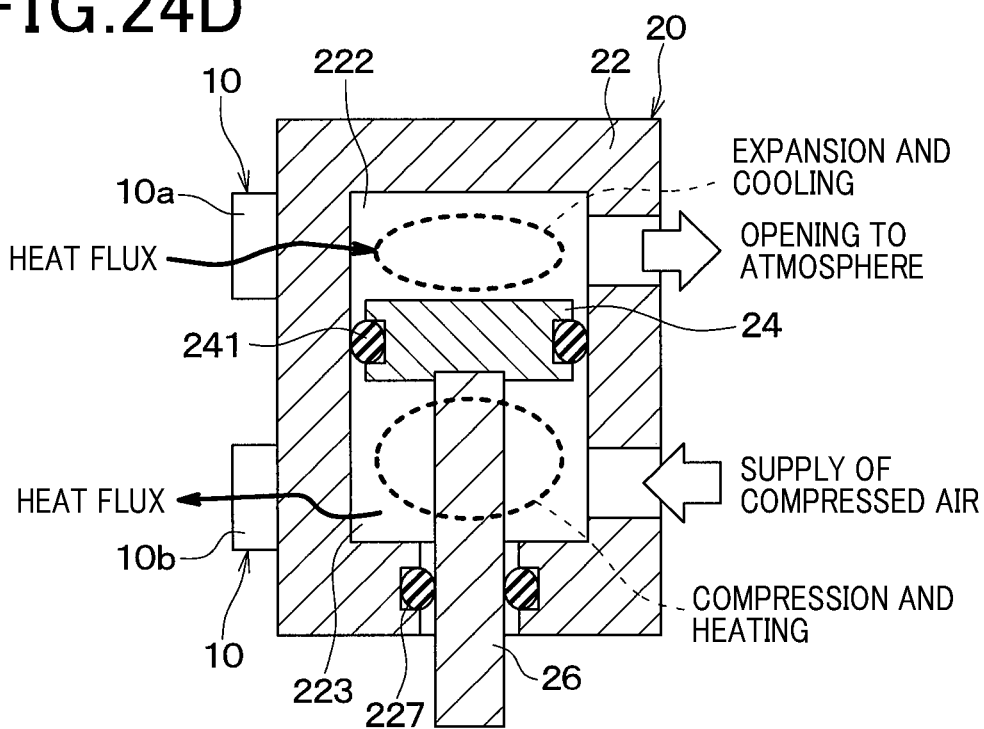
FIG. 24D is a cross-sectional view of the air cylinder in a normal operation period P24 according to the fifth embodiment.

In the period P24, as illustrated in FIG. 24D, the piston 24 is stopped by a fourth stopper which is not illustrated. Then, the pressure in the second chamber 223 becomes constant at a predetermined pressure. This causes heating of the air in the second chamber 223 to be saturated, resulting in the second heat flux gradually decreasing to be close to zero. The state of the first chamber 222 becomes the state of atmospheric pressure, resulting in the absolute value of the first heat flux gradually decreasing to be close to zero.

As in the first embodiment, the control apparatus 12 of the present embodiment performs abnormality diagnosis control. That is, the control apparatus 12 compares the measurement result of each heat flux sensor with a corresponding criterion; the criterion for each heat flux sensor is determined in advance based on the above-described change of the corresponding heat flux in the normal operation. Then, the control apparatus 12 determines whether there is an abnormality in the air cylinder 20 based on the comparison result. This enables abnormality diagnosis of the air cylinder 20 to be carried out.

Other Embodiments

The present disclosure is not limited to the above-described embodiments, and can be appropriately modified as described below within the scope recited in the claims.

In the above-described embodiments, the first heat flux sensor 10a and the second heat flux sensor 10b are used as the heat flux sensor 10. Only one of the first heat flux sensor 10a and the second heat flux sensor 10b can be used. This is because, when there is an abnormality in the air cylinder 20, change of the heat flux for each of the first and second chambers 222 and 223 over time is different from change of the heat flux for the corresponding one of the first and second chambers 222 and 223 over time in the normal operation.

In the above-described embodiments, a target apparatus which is the target of abnormality diagnosis is an air cylinder, that is, pneumatic equipment configured to linearly move. The target apparatus can be pneumatic equipment in which an actuating member is configured to perform, based on air pressure, operations other than linear operation. The pneumatic equipment, which performs operations other than linear operation, includes a housing having internal space, and an actuating member disposed inside the internal space, which is similar to the configuration of the air cylinder. The actuating member causes the internal space of the housing to be separated into two chambers. The actuating member is configured to move based on compressed air supplied to one of the two chambers partitioned by the actuating member.

The driven equipment is not limited to driven equipment powered based on air pressure, but also can be fluid-pressure driven equipment powered by fluid pressure, such as oil hydraulic pressure and water hydraulic pressure, other than the air pressure. In this fluid-pressure drive equipment, an actuating member moves based on a fluid supplied to one of the two chambers separated by the actuating member. The fluid supplied to the chamber is compressed or expanded, so that a heat flux between the inside and outside of the chamber changes. Measuring the change of the heat flux using a heat flux sensor enables whether there is an abnormality in the driven equipment to be diagnosed.

The target apparatus is not limited to the fluid-pressure driven equipment. An apparatus having a chamber in which at least one of compression and expansion of a fluid is performed inside is configured such that a heat flux between the inside and outside of the chamber changes. The above-described abnormality diagnosis apparatus 1 is therefore capable of performing abnormality diagnosis of the target apparatus having such a chamber in which at least one of compression and expansion of the fluid is performed inside.

Examples of such a target apparatus can include, for example, fluid valves, shock absorbers, and pressure tanks.

Fluid valves have a movable mechanism configured to cause the flow channel of a fluid to be open and closed to thereby enable the fluid to pass therethrough, stop the flow of the fluid, or control the fluid. Ball valves are an example of these fluid valves.

Figure 26:
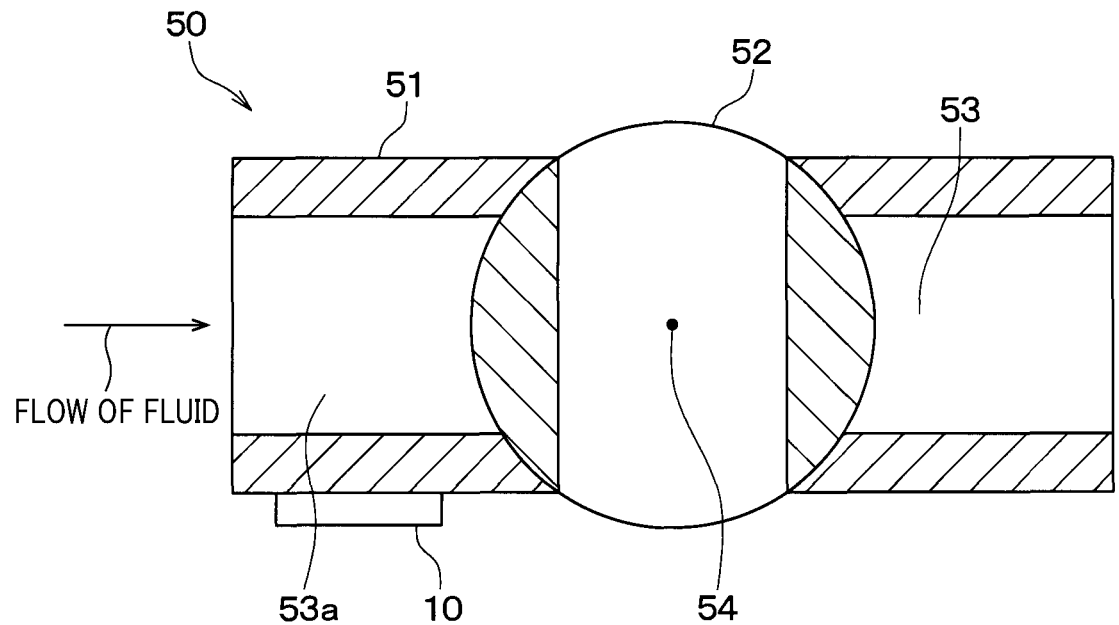
FIG. 26 is a cross-sectional view of a ball valve according to a modified embodiment.
Figure 27:
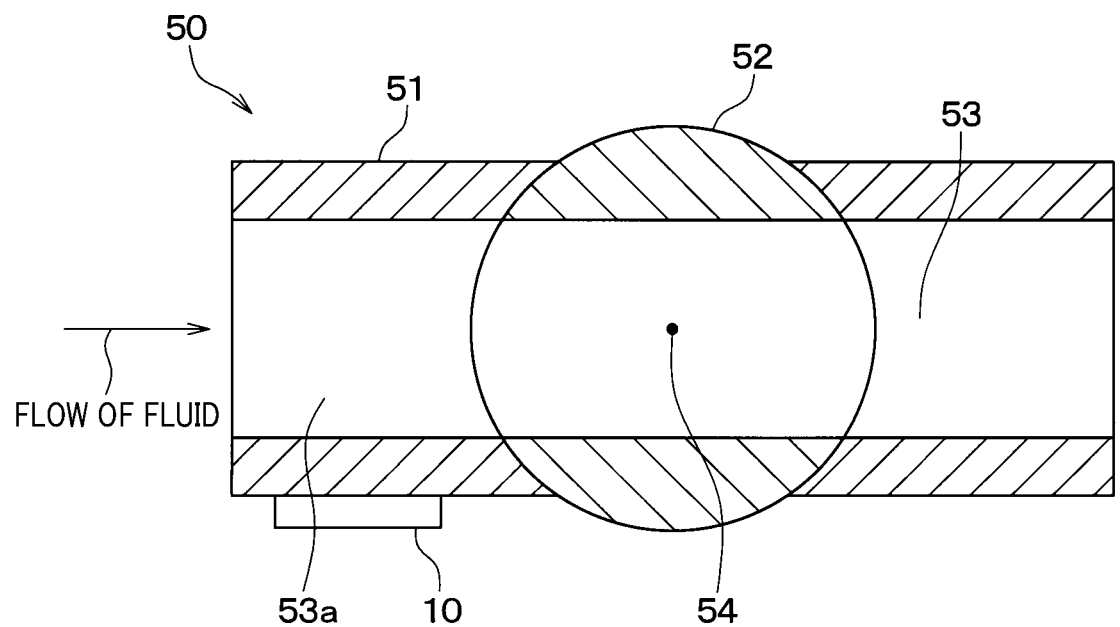
FIG. 27 is a cross-sectional view of the ball valve according to the modified embodiment.

As illustrated in FIG. 26 and FIG. 27, a ball valve 50 includes a body 51 and a ball 52. The body 51 serves as a flow channel defining member configured to define a flow channel 53 for a fluid thereinside. The ball 52 is a spherical valving element configured to open or close the flow channel 53. The ball valve 50 includes unillustrated seal members.

Rotation of the ball 52 around an axial center 54 by 90 degrees causes the flow channel 53 to be open or closed. As illustrated in FIG. 26, when the state of the ball 52 is switched from an open state to open flow channel 53 to a close state to close the flow channel 53, the pressure of the fluid in an upstream flow channel 53a located upstream of the ball 52 in the flow channel 53 increases as compared to the pressure of the fluid before the state of the ball 52 is switched from the open state to the close state. This results in the fluid being compressed.

In contrast, as illustrated in FIG. 27, when the state of the ball 52 is switched from the close state to close the flow channel 53 to the open state to open the flow channel 53, the pressure of the fluid in the upstream flow channel 53a decreases as compared to the state of the ball 52 is switched from the close state to the open state. This results in the fluid being expanded.

As described above, switching between the open state and close state of the ball valve 50 enables the fluid in the upstream flow channel 53a to be compressed or expanded, resulting in a heat flux being changed between the upstream flow channel 53a and the outside of the body 51. The upstream flow channel 53a in the ball valve 50 therefore corresponds to a chamber in which at least one of compression and expansion of a fluid is performed. The upstream flow channel 53a is one of the chambers partitioned by a valving element.

Fluid valves typified by such a ball valve 50 may malfunction due to breakage of the valving element, biting of a foreign substance, degradation of the seal members, or other causes. For diagnosing whether there is such a malfunction, a measurement device, such as a manometer or a flowmeter, can be provided in the flow channel.

In this case, there is a possible approach, which forms a hole through a wall constituting the flow channel to attach a measurement device to the hole. However, in the case where airtightness is important, it is not possible to form a hole to provide a measurement device. In the case where a measurement device, such as a manometer or a flowmeter is provided, because the measurement device comes into contact with the fluid, measurement devices that can be used are limited in terms of their chemical resistances depending on a type of the fluid. Alternatively, it is difficult to provide any measurement device depending on the type of the fluid.

From this viewpoint, the heat flux sensor 10 is provided at a portion of the outer surface of the body 51; the portion is located to be close to the upstream flow channel 53a. The heat flux sensor 10 measures a heat flux between the upstream flow channel 53a and the outside of the body 51. The control apparatus 12 determines whether there is a malfunction in the ball valve 50 based on the measurement result of the heat flux using the heat flux sensor 10.

The abnormality diagnosis apparatus of this ball valve 50 is capable of diagnosing whether there is an abnormality in the ball valve 50 without a hole being formed through the body 51 for attaching a measurement device thereto. The heat flux sensor 10 is attached to the outside of the body 51, making it possible to prevent the heat flux sensor 10 from contacting with the fluid. This enables whether there is an abnormality in the ball valve 50 to be diagnosed regardless of the type of the fluid.

Shock absorbers damp shock and vibration of an actuator of machines to thereby reduce noise and damage. Shock absorbers include a twin tube shock absorber.

Figure 28:
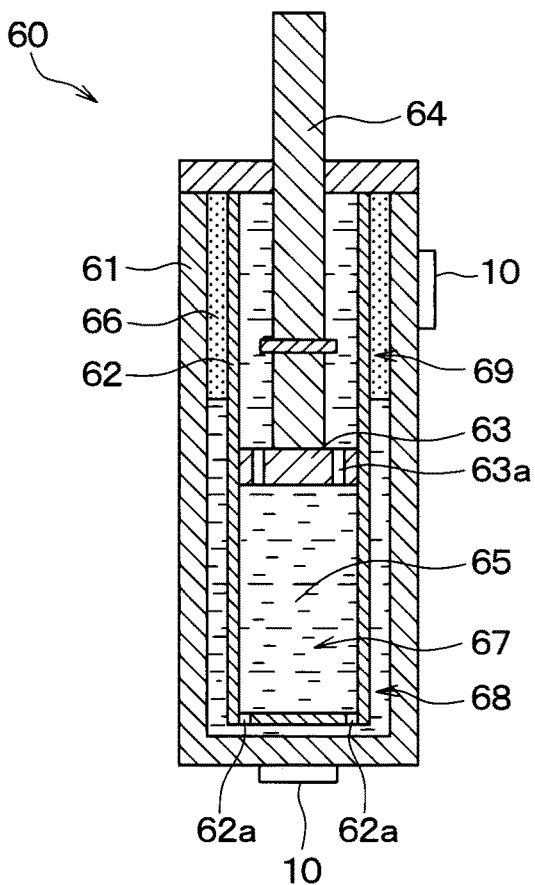
FIG. 28 is a cross-sectional view of a shock absorber according to a further modified embodiment.

As illustrated in FIG. 28, a twin tube shock absorber 60 includes an outer tube 61, an inner tube 62, a piston 63, a piston rod 64, oil 65 and gas 66.

The inner tube 62 is disposed inside the outer tube 61. The inner tube 62 has a base valve 62a mounted onto the bottom thereof. The piston 63 is disposed inside the inner tube 62. The piston 63 includes a piston valve 63a. The piston rod 64 is continuously joined to the piston 63.

The oil 65 is disposed inside the inner tube 62 and between the outer tube 61 and the inner tube 62. This results in the inside of the inner tube 62 serving as an oil chamber 67 in which the oil 65 exists. A chamber in which the oil 65 exists between the outer tube 61 and the inner tube 62 serves as an oil chamber 68. The gas 66 is disposed between the outer tube 61 and the inner tube 62. A chamber in which the gas 66 exists between the outer tube 61 and the inner tube 62 therefore serves as a gas chamber 69.

Fluid resistance caused when the oil 65 passes through the piston valve 63a and the base valve 62a generates damping force of the shock absorber 60. When the piston rod 64 goes down by being subjected to shock, the shock is damped by the oil 65 passing through the piston valve 63a and the base valve 62a, resulting in the pressures of the oil 65 and the gas 66 increasing. That is, the oil 65 and the gas 66 are compressed.

In contrast, when the piston rod 64 goes up, the pressures of the oil 65 and the gas 66 decreasing, resulting in the oil 65 and the gas 66 being expanded. Each of the oil chambers 67 and 68 and the gas chamber 69 corresponds to a chamber in which at least one of compression and expansion of a corresponding fluid is performed.

The shock absorber 60 may have malfunctioned due to gas leakage caused by, for example, degradation of the seal members. For diagnosing whether there is such a malfunction, there is a possible approach, which forms a hole through the outer tube 61 to attach a manometer to the hole. However, because the pressure inside the outer tube 61 is set to enable the shock absorber 60 to absorb assumed shock, it is not preferable to form a hole through the outer tuber 61 for mounting a manometer later to the hole.

From this viewpoint, the heat flux sensors 10 are provided at respective portions of the outer surface of the outer tube 61; the portions are located to be close to the respective oil chambers 67 and 68. Each heat flux sensor 10 measures a heat flux between the corresponding one of the oil chambers 67 and 68 and the outside thereof.

Alternatively, the heat flux sensor 10 is disposed at a portion of the outer surface of the outer tube 61; the portion is located to be close to the gas chamber 69. The heat flux sensor 10 measures a heat flux between the inside and outside of the gas chamber 69. The control apparatus 12 determines whether there is a malfunction in the shock absorber 60 based on the measurement result of each heat flux sensor 10.

This enables whether there is an abnormality in the shock absorber 60 to be diagnosed without a hole being formed through the outer tube 61 for mounting a manometer thereto.

Figure 29:
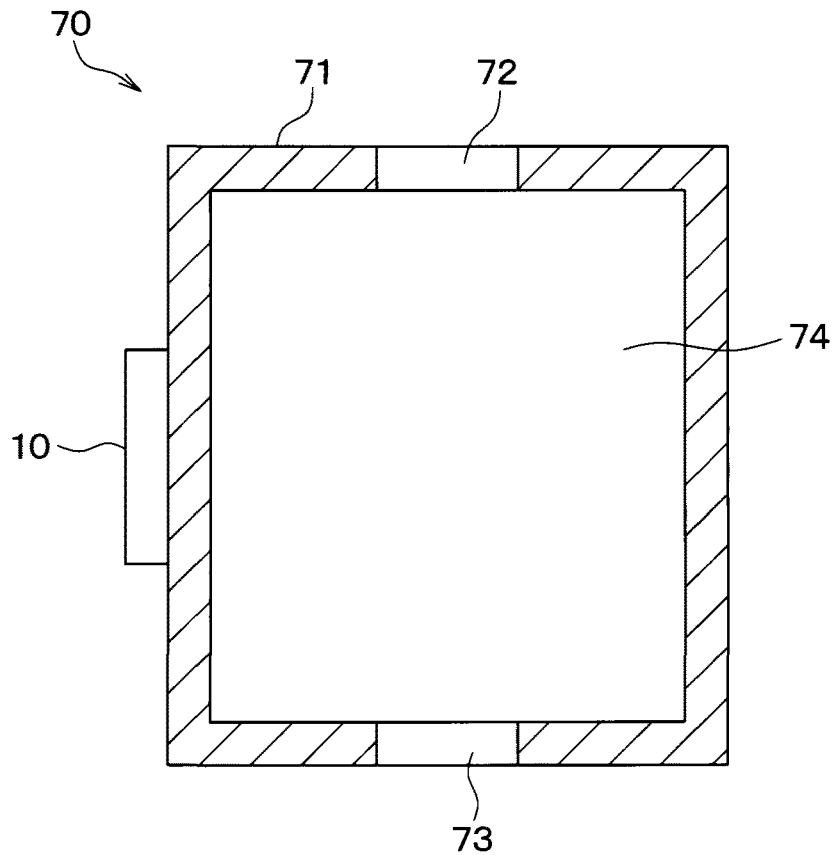
FIG. 29 is a cross-sectional view of a pressure tank according to a still further modified embodiment.

Pressure tanks store a pressure-boosted fluid, such as air or oil. As illustrated in FIG. 29, a pressure tank 70 includes a container 71 in which a fluid is stored. The container 71 has an inlet 72 and an outlet 73 of the fluid. The inside of the container 71 serves as a chamber 74 in which the fluid is stored. The pressure tank 70 also includes unillustrated seal members for sealing, for example, connection portions of the container 71.

Change of the pressure in the chamber 74 causes the fluid to be compressed or expanded. This causes the chamber 74 to serve as a chamber in which at least one of compression and expansion of the fluid is performed.

The pressure tank 70 may malfunction due to leakage of the fluid due to, for example, degradation of the seal members. For diagnosing whether there is such a malfunction, there is a possible approach, which forms a hole through the container 71 to attach a manometer to the hole. However, in the case where airtightness of the container 71 is important, it is not allowed to form a hole through the container 71 to provide a manometer. Measurement devices that can be used are limited in terms of their chemical resistances depending on the type of the fluid.

From this viewpoint, the heat flux sensor 10 is provided on the outer surface of the container 71. The heat flux sensor 10 measures a heat flux between the inside and outside of the chamber 74. The control apparatus 12 determines whether there is a malfunction in the pressure tank 70 based on the measurement result of the heat flux sensor 10.

This enables whether there is an abnormality without a hole being formed through the container 71 for attaching a manometer thereto. The heat flux sensor 10 mounted to the outside of the container 71, enables whether there is an abnormality in the pressure tank 70 to be diagnosed regardless of the type of the fluid.

While, in the above-described embodiments, the characteristic configurations of the present disclosure are applied to abnormality diagnosis apparatuses, the characteristic configurations of the present invention can be applied to monitoring apparatuses other than abnormality diagnosis apparatuses.

That is, in the above-described embodiments, the control apparatus 12 determines whether there is an abnormality in the target apparatus based on a measurement result of a heat flux sensor 10. In contrast, the control apparatus 12 can determine the pressure state of a fluid in the target apparatus based on a measurement detection result of a heat flux sensor 10.

Determination of the pressure state of the fluid includes determination as to which of a plurality of predetermined states the pressure state of the fluid corresponds to in the case where the pressure state of the fluid changes to one of the plurality of predetermined states.

For example, in the air cylinder 20 described in the first embodiment, in the case where the pressure state of air sequentially changes to the state illustrated in FIG. 4A, the state illustrated in FIG. 4B, and the state illustrated in FIG. 4C, as described above, heat fluxes are changed as shown in the periods P1, P2 and P3 in FIG. 5. This enables the control apparatus 12 to determine which of the state illustrated in FIG. 4A, the state illustrated in FIG. 4B and the state illustrated in FIG. 4C the pressure state of air corresponds to in accordance with the measurement result of each heat flux sensor 10. The control apparatus 12 is capable of detecting a present position of the piston 24 based on the determination result and the relationship between the pressure state of air and the present position of the piston 24.

While, in the above-described embodiments, a heat flux sensor having the structure illustrated in FIGS. 2 and 3 is used as each heat flux sensor 10, a heat flux sensor having another structure can be used.

While, in the above-described embodiments, a display apparatus 14 is used as an informing apparatus, a sound generating apparatus, such as a buzzer, can be used.

The above-described embodiments are not irrelevant to each other and can be appropriately combined except a case where combination is obviously impossible. In the above-described embodiments, components constituting each of the embodiments are not always essential except a case where it is clearly specified that the components are particularly essential, a case where the components are obviously essential in principle, or other specific cases.

The following describes summary of the present disclosure.

According to a first aspect shown in part or all of the above-described embodiments, a monitoring apparatus includes a heat flux sensor and a determining unit. The heat flux sensor is provided for the target apparatus and configured to measure a heat flux between inside and outside of the chamber. The determining unit is configured to determine the pressure state of the fluid based on a measurement result of the heat flux sensor.

According to a second aspect, the target apparatus of the monitoring apparatus includes a housing having an internal space inside the target apparatus, and an actuating member disposed in the internal space. The actuating member is configured to partition the internal space of the housing into first and second chambers. The actuating member is configured to move based on the fluid supplied to one of the first and second chambers. The heat flux sensor measures the heat flux between inside and outside of at least one of the first and second chambers.

According to a third aspect, an abnormality diagnosis apparatus aims to diagnose whether there is an abnormality in a target apparatus having a chamber in which at least one of compression and expansion of a fluid is performed. The abnormality diagnosis apparatus includes a heat flux sensor and a determining unit. The heat flux sensor is provided for the target apparatus, and configured to measure a heat flux between inside and outside of the chamber. The determining unit is configured to determine whether there is an abnormality in the target apparatus based on a measurement result of the heat flux sensor.

According to a fourth aspect, the target apparatus of the abnormality diagnosis apparatus includes a housing having internal pace thereinside, and an actuating member disposed in the internal space. The actuating member is configured to partition the internal space of the housing into first and second chambers. The actuating member is configured to move based on the fluid supplied to one of the first and second chambers. The heat flux sensor measures the heat flux between inside and outside of at least one of the first and second chambers.

Note that the present application is based on and claims the benefit of priority from earlier Japanese Patent Applications No. 2015-197894 and No. 2016-064556, the description of which is incorporated herein by reference.

REFERENCE SIGNS LIST

1 Abnormality diagnosis apparatus
10 Heat flux sensor
12 Control apparatus
20 Air cylinder
22 Cylinder
24 Piston
40 Rod-less cylinder

What is claimed is:

1. A monitoring apparatus for monitoring a pressure state of a fluid in a target apparatus having a chamber in which at least one of compression and expansion of the fluid is performed, the monitoring apparatus comprising:
   a heat flux sensor provided for the target apparatus and configured to measure a heat flux between inside and outside of the chamber; and
   a determining unit configured to determine the pressure state of the fluid based on a measurement result of the heat flux sensor.

2. The monitoring apparatus according to claim 1, wherein:
   the target apparatus comprises a housing having internal space thereinside, and an actuating member disposed in the internal space;
   the actuating member is configured to partition the internal space of the housing into first and second chambers;
   the actuating member is configured to move based on the fluid supplied to one of the first and second chambers; and
   the heat flux sensor measures the heat flux between inside and outside of at least one of the first and second chambers.

3. The monitoring apparatus according to claim 1, wherein:
   the determining unit is configured to:
      perform a comparison of a measurement value of the heat flux based on the measurement result of the heat flux sensor with a predetermined threshold; and
      determine the pressure state of the fluid based on a result of the comparison.

4. The monitoring apparatus according to claim 3, wherein:

the threshold is associated with at least one of a normal waveform and an abnormal waveform, the normal waveform representing change of the heat flux in normal operation, the abnormal waveform representing change of the heat flux in abnormal operation.

5. The monitoring apparatus according to claim 4, wherein:

the threshold includes a plurality of thresholds;

the abnormal waveform includes a plurality of abnormal waveforms; and each of the plurality of thresholds is associated with a corresponding one of the normal waveform and the plurality of abnormal waveforms.

6. An abnormality diagnosis apparatus for diagnosing whether there is an abnormality in a target apparatus having a chamber in which at least one of compression and expansion of a fluid is performed, the abnormality diagnosis apparatus comprising:

a heat flux sensor provided for the target apparatus and configured to measure a heat flux between inside and outside of the chamber; and a determining unit configured to determine whether there is an abnormality in the target apparatus based on a measurement result of the heat flux sensor.

7. The abnormality diagnosis apparatus according to claim 6, wherein:

the target apparatus comprises a housing having internal space thereinside, and an actuating member disposed in the internal space;

the actuating member is configured to partition the internal space of the housing into first and second chambers;

the actuating member is configured to move based on the fluid supplied to one of the first and second chambers; and the heat flux sensor measures the heat flux between inside and outside of at least one of the first and second chambers.

8. The abnormality diagnosis apparatus according to claim 6, wherein:

the determining unit is configured to:

perform a comparison of a measurement value of the heat flux based on the measurement result of the heat flux sensor with a predetermined threshold; and determine the pressure state of the fluid based on a result of the comparison.

9. The abnormality diagnosis apparatus according to claim 8, wherein:

the threshold is associated with at least one of a normal waveform and an abnormal waveform, the normal waveform representing change of the heat flux in a normal operation, the abnormal waveform representing change of the heat flux in an abnormal operation.

10. The abnormality diagnosis apparatus according to claim 9, wherein:

the threshold includes a plurality of thresholds;

the abnormal waveform includes a plurality of abnormal waveforms; and each of the plurality of thresholds is associated with a corresponding one of the normal waveform and the plurality of abnormal waveforms.

* * * * *